United States Patent [19]

Heidolph et al.

[11] Patent Number: 5,409,724
[45] Date of Patent: Apr. 25, 1995

[54] LEAVENING COMPOSITION AND PROCESS OF MAKING

[75] Inventors: Barbara B. Heidolph, Wentzville; David R. Gard, Ballwin, both of Mo.

[73] Assignee: Monsanto Company, St. Louis, Mo.

[21] Appl. No.: 77,588

[22] Filed: Jun. 18, 1993

[51] Int. Cl.$^6$ ............................................. A21D 2/02
[52] U.S. Cl. ................................... 426/562; 426/551; 426/563; 426/565
[58] Field of Search ................ 426/562, 563, 565, 551

[56] References Cited

U.S. PATENT DOCUMENTS

| | | |
|---|---|---|
| 990,699 | 4/1911 | Brown et al. |
| 1,834,747 | 12/1931 | Stokes et al. |
| 1,847,799 | 3/1932 | Weil |
| 2,133,286 | 5/1937 | Fiske et al. |
| 2,138,029 | 11/1938 | Fiske et al. |
| 2,263,487 | 11/1941 | Cox et al. |
| 2,366,857 | 7/1942 | Hurka |
| 2,844,437 | 7/1958 | Kramer et al. |
| 2,870,017 | 1/1959 | Barch |
| 4,966,782 | 10/1990 | Heidolph et al. |
| 5,225,226 | 7/1993 | Thomas et al. ..................... 426/562 |

FOREIGN PATENT DOCUMENTS 0350607 1/1990 European Pat. Off.

OTHER PUBLICATIONS

Tucker, J. 1959, Phosphates in Foods, Cereal Science Today, vol. 4, No. 4, pp. 91 & 92.
"Study of Polyphosphates of Sodium, Potassium and Calcium" by Claudine Morin, Bull Soc Chim 1726–1724.
"Chemical Leavening Agents and Their Characteristic Action in Doughs" by R. A. Barackman, Cereal Chem vol. 8 pp. 423–430, (1931).
"The Phosphates of Calcium Part V, Revision of the Earlier Space Diagram" by H. Bassett; J. Chem. Soc. 1958, 2949–2955.
"Solubility in the CaO-P2O5-H2) System at High Temperatures in the Formation Range of Condensed Phosphates" by L. Eraizer et al, Inorg. Mater., 22(8) 1189–1193 (1986).
"Preparation and Characterization of Some Calcium Pyrophosphates" by E. H. Brown et al Agricultural and Food Chemistry, pp. 214–222, (1963).

Primary Examiner—Helen Pratt
Attorney, Agent, or Firm—R. Loyer

[57] ABSTRACT

A novel leavening composition comprising calcium acid pyrophosphate in combination with a carbonate factor, said composition exhibiting, in the dough rate of reaction (DRR) test, a maximum rate of release of carbon dioxide occurring between about 17 to about 40 minutes after initial mixing, said maximum rate being at least twice the rate observed at the termination of the mixing time of said test. The pyrophosphate is particularly useful in leavening systems for refrigerated dough in that an initial low rate of reaction with the carbonate factor is observed after which there is a large increase in the rate of reaction without change in temperature. The leavening composition is also useful in batters, dry mixes, frozen and refrigerated doughs and refrigerated batters.

15 Claims, 19 Drawing Sheets

LEAVENING COMPOSITION AND PROCESS OF MAKING

This invention relates to novel leavening compositions and to systems employing such compositions. More particularly, the invention relates to calcium acid pyrophosphate exhibiting unique leavening action as the acid factor in baking preparations.

BACKGROUND OF THE INVENTION

Various salts of the acids of phosphoric acid, usually orthophosphoric acid or pyrophosphoric acid are commonly employed as the acid factor in combination with a carbonate factor in leavening systems. Because the calcium and sodium salts exhibit different reaction profiles, both find use as leavening acids in different applications. Both sodium and calcium salts have been widely used as the acid factor in leavening systems.

A baking preparation employing one form of calcium acid pyrophosphate is described in U.S. Pat. No. 990,699 to Brown et al. The calcium salt is obtained by roasting calcium orthophosphate thereby removing about 2 moles of water from each mole of the orthophosphate. Calcium acid pyrophosphate prepared in such manner has a desirable reaction profile for some applications indicating a rapid rate of reaction. The product is usually impure having large amounts of other phosphates including unreacted calcium monophosphate.

The use of sodium acid pyrophosphate as an acid factor in bakery leavening is known but an undesirable flavor has been observed. Mixing a calcium acid phosphate salt with sodium acid pyrophosphate has been found to reduce or eliminate the taste and also control the evolution of gas after mixing the baking ingredients. In U.S. Pat. No. 1,834,747 to Stokes et al. there is described baking powder formulas which contain the usual sodium bicarbonate together with alkaline earth metal phosphates such as mono-calcium phosphate in admixture with sodium acid pyrophosphate. It is reported that the mixture results in a slowing of the evolution of carbon dioxide as compared to sodium acid pyrophosphate alone thereby allowing a more desirable reaction profile. With variation in the amounts of the various salts it is reported that the evolution of gas during leavening can be controlled to provide varied reaction profiles depending upon the requirements.

The leavening properties of a certain calcium acid pyrophosphate was recognized in U.S. Pat. No. 1,847,799 wherein a completely dehydrated, neutral calcium pyrophosphate was employed as a filler in baking powder compositions. It was observed therein that calcium phosphate dried at only one hundred degrees losses its water only slowly while at higher temperatures all of the water is removed. Incorporation of neutral calcium pyrophosphate provided storage stability to baking powders such that the leavening action was not lost upon prolonged standing or exposure to atmospheric moisture.

In U.S. Pat. No. 2,133,286 there are disclosed several calcium acid tetraphosphates useful as acid factors in leavening with a carbonate factor such as sodium bicarbonate.

The reaction rate of monocalcium phosphate during leavening is modified by the addition to the system of calcium acid pyrophosphate according to U.S. Pat. No. 2,263,487. The pyrophosphate is prepared by heating monocalcium phosphate to a temperature in the range of from about 200° C. to about 250° C. whereby a coating of the pyrophosphate is formed around at least a portion of the exterior of the monocalcium phosphate particles. It was observed that the calcium acid pyrophosphate coating on the monocalcium phosphate particles lowered the rate of release of carbon dioxide when only 10 percent of the particle was converted to the acid pyrophosphate. Further, it was found that additional formation of calcium acid pyrophosphate on the monocalcium phosphate particles, up to total coating, did not serve to further lower the rate of release of carbon dioxide but rather prolonged the low rate. Gas evolution curves compared results obtained from calcium acid pyrophosphate alone with monocalcium phosphate having varying amounts converted to the pyrophosphate. The rate of reaction for calcium acid pyrophosphate alone indicated by percent of carbon dioxide release shows a fairly constant, slow rate providing only 40% of the available carbon dioxide after one hour.

The use of milk in the baking formula has been observed to cause a loss of elasticity and specific volume of the baked product (biscuits) when calcium acid pyrophosphate is employed as the leavening acid. Such effects are shown in U.S. Pat. No. 2,366,857 and were attributed to the reaction of calcium in the milk with calcium acid pyrophosphate. Such effects were found to be abated by the addition to the baking formula of small amounts of alkali metal hexa metaphosphate. The calcium acid pyrophosphate employed in this patent was prepared by the "Booth" method wherein phosphoric acid is reacted with calcium hydroxide in the form of quick lime with the acid at a temperature above 180° C. but below 300° C. The product of the reaction is a mixture of calcium salts including the pyrophosphate and monocalcium orthophosphate. According to this disclosure calcium acid pyrophosphate prepared by heating calcium orthophosphate may also be employed as the leavening acid improved by the addition of hexa metaphosphate.

More recently, in EPO 0 350 607 A2 there has been reported the use of acidic calcium pyrophosphate as a leavening agent in baking processes for which such compound was formerly believed to be unsuitable. More particularly, it has been observed to perform satisfactorily in ready-made doughs which are frozen for extended periods of time before baking. Formerly, acidic calcium pyrophosphate reacted quickly in the dough, making it useful only when the dough was immediately processed. The relatively slow action of the calcium acid pyrophosphate is reportedly achieved by providing it in highly pure form from the dehydration reaction of monocalcium phosphate or the monohydrate thereof in a thin layer on the walls of a closed reactor which is closely controlled so as to heat the thin layer to a temperature in the range of from about 255°–330° C. The identity of the product as calcium acid pyrophosphate was reportedly confirmed by x-ray powder diffraction. By carefully controlling the dehydration process it is claimed that calcium acid pyrophosphate is obtained having a purity of at least 95%. The product is found to be in admixture with small amounts of monocalcium phosphate and calcium metaphosphates.

From the above noted prior art there is a pattern of activity in the baking industry which has characterized the leavening action of calcium acid pyrophosphate as slow acting. In instances of reported fast reaction it would seem to depend upon the purity of the pyrophosphate, as the usual method for preparing the pyrophosphate disclosed in the literature provides a mixture of both monocalcium orthophosphate and calcium acid pyrophosphate.

The characteristics of a leavening system can be determined by means of a test commonly known in the industry as the "Dough Rate of Reaction" (DRR) test. Because the DRR test has been employed in research laboratories for a long period of time, the test has been found to be a reliable indicator of how a leavening system will operate in actual use. The test is described by Parks et al. in Cereal Chemistry, Vol. 37, pp. 503-518 July, 1960 hereby incorporated by reference. According to said test, the reaction characteristics of a leavening system, comprising an acid factor and a carbonate factor in a specified biscuit dough is determined. The characteristics are determined by measuring the amount of carbon dioxide released beginning with initial mixing of the dough ingredients and during subsequent time periods. The test is repeated at several different temperatures which are held constant throughout the test. By measuring the amount of carbon dioxide gas produced during specified time periods, a reaction profile (amount of $CO_2$/time) of the leavening system can be determined. The results of such tests are best viewed by means of graphical display of the data.

Previously, there has not been observed any calcium acid pyrophosphate, no matter how prepared, which exhibited a variable rate of reaction, i.e., remaining relatively slow acting for a time and then, without change of condition such as temperature, providing a more rapid rate of reaction and releasing a large amount of carbon dioxide relative to the amount theoretically available.

BRIEF DESCRIPTION OF THE INVENTION

In accordance with this invention there is provided a novel leavening composition comprising a carbonate factor and calcium acid pyrophosphate, said composition exhibiting, in the DRR test, a maximum rate of release of carbon dioxide at a temperature of 40° C. occurring between about 17 to about 40 minutes after initial reaction, said maximum rate being at least twice the rate observed at the termination of the mixing time in said test.

It has been discovered that the calcium acid pyrophosphate of this invention, when employed as the acid factor in a leavening system, provides a unique reaction profile with ordinary carbonate factors such as sodium bicarbonate. At constant temperature, as is employed in the DRR test, the calcium acid pyrophosphate of this invention exhibits an initial slow reaction rate followed by a relatively rapid increase in reaction rate. Such characteristics or reaction profile in mixed dough is highly advantageous when the dough is intended for use in refrigerated or frozen dough regimes or in batter products requiring extended bench time. Furthermore, the calcium acid pyrophosphate of this invention provides, in a leavening system, a large amount of carbon dioxide relative to the total amount theoretically available. That is, after 60 minutes at 40° there is released at least 2-½ times the amount of carbon dioxide as was released at the time mixing is terminated (3 minutes after initial mixing) in the DRR test.

The calcium acid pyrophosphate of this invention can be prepared by the addition of monocalcium phosphate monohydrate to an excess of phosphoric acid at elevated temperature whereby crystals of calcium acid pyrophosphate are formed. Usually, the crystal habit of such calcium acid pyrophosphate is platelet or tabular.

BRIEF DESCRIPTION OF THE DRAWINGS

The attached drawings show graphically the results of DRR tests indicating the reaction profile of various leavening systems.

FIGS. 1A-9A show the results when the data of FIGS. 1-9 are converted to the rate per minute of carbon dioxide evolution as a percent of total carbon dioxide theoretically available in the DRR test run at 40° C. The data graphically displayed in these figures are termed herein the "minute differential" curves which more visibly show the time delayed reaction in the DRR test run at 40° C.

DETAILED DESCRIPTION OF THE INVENTION

Figure 1:
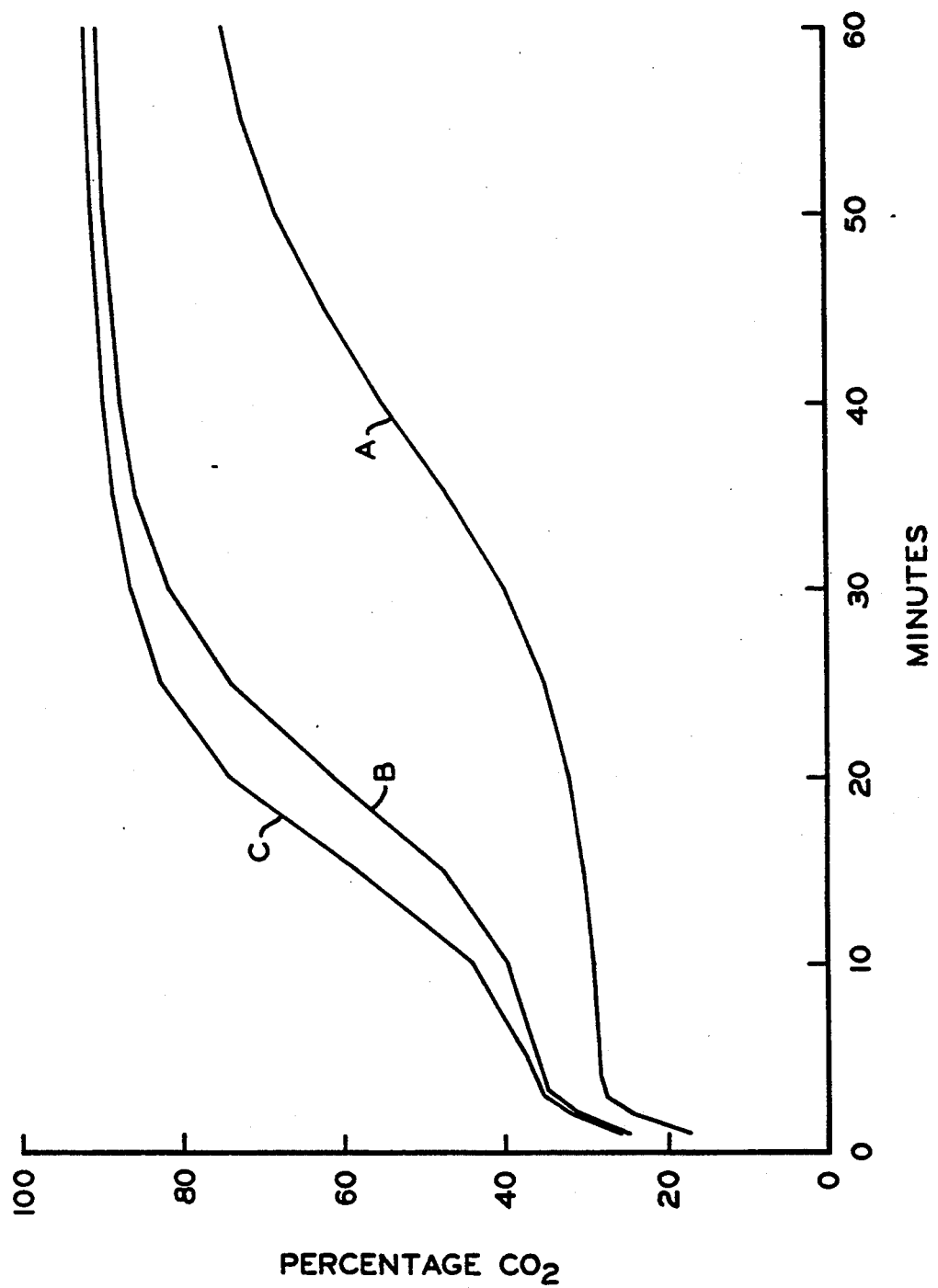
FIG. 1 shows the result of the DRR test employing a leavening system of this invention where in the calcium acid pyrophosphate of this invention is obtained by the reaction of monocalcium phosphate monohydrate and phosphoric acid.

One method for obtaining the novel calcium acid pyrophosphate of this invention is provided by adding monocalcium orthophosphate or the monohydrate thereof to a molar excess of phosphoric acid at elevated temperature. By the term "elevated temperature" is meant a temperature in the range of from about 180° C. to about 250° C., preferably in the range of from about 200° C. to about 220° C. By the term "molar excess" is meant an excess of phosphoric acid expressed as $H_3PO_4$ over the calcium ion source expressed as calcium oxide of at least about 3 to 1 and typically about 5 to 1 up to about 15 to 1. Preferably a molar excess of phosphoric acid to calcium oxide source in the range of about 7 to about 15 to 1 may be employed. One means to obtain the crystals found useful in accordance with this invention is the step-wise addition of the orthophosphate to the phosphoric acid. Such processes are described in the literature by H. Bassett, J. Chem. Soc. 1958, pp 2949-2955 and by L. N. Eraizer et al, Inorganic Materials 1986 22(8), pp. 1189-1193. After recovery of the crystalline product by the usual means such as filtration, the crystals may be washed with an organic solvent such as acetone to provide a product having a high degree of purity as indicated by x-ray diffraction pattern published by Morin, Bull. Soc Chim. France, 1726 (1961).

The crystalline product of the above described reaction is employed as the acid factor in leavening systems in typical application with a carbonate factor. Carbonate factors include any suitable basic materials such as sodium bicarbonate as well as other basic materials such as potassium bicarbonate, amorphous calcium carbonate or ammonium bicarbonate, and the like.

It has been found that approximately 100 parts, by weight, of the calcium acid pyrophosphate of this invention is employed to neutralize 69 parts, by weight, sodium bicarbonate. Appropriate amounts of the calcium acid pyrophosphate useful in various leavening systems are easily calculated in view of the above. Other amounts may be employed to provide particular desired finished product characteristics. Suitable weight ratios of the leavening acid of this invention to several carbonate factors is in the range of from about 1.24:1 to about 1.91:1, preferably from about 1.36:1 to about 1.72:1 for most baked goods.

The reactivity of the calcium acid pyrophosphate containing leavening system of this invention was evaluated in the DRR test as described by Parks et al. in Cereal Chemistry, Vol. 37, pp. 503–518 July, 1960 hereby incorporated by reference. According to said test the reaction rate of a leavening system in a specified biscuit dough is measured manometrically during mixing and during subsequent time periods at constant temperature, by a standardized procedure. By measuring the amount of carbon dioxide gas produced during specified time periods, a reaction profile (amount of $CO_2$/time) of the leavening system is determined. The results of such tests are best viewed by means of graphical display of the data.

There is provided chemical leavening systems for baked goods in accordance with this invention by combining leavening acid of this invention as the acid factor with a suitable carbonate factor. Carbonate factors useful in accordance with this invention are those previously known.

The calcium acid pyrophosphate of this invention can be employed in admixture with other previously known leavening acids which include, without limitation, monosodium dihydrogen phosphate; sodium aluminum phosphate acidic; a mixture of sodium aluminum phosphate acidic with aluminum sulphate anhydrous; a mixture of sodium aluminum phosphate acidic with anhydrous coated monocalcium phosphate; monocalcium phosphate; anhydrous monocalcium phosphate, coated; sodium acid pyrophosphate; citric acid; mixtures of monocalcium phosphate and sodium acid pyrophosphate; mixtures of sodium aluminum sulphate and monocalcium phosphate; monocalcium phosphate, anhydrous; fumaric acid; monocalcium phosphate and sodium aluminum phosphate mixtures; glucono-Δ-lactone; monopotassium tartrate; sodium aluminum sulfate; aluminum sulfate and any other suitable, edible, non-toxic acid.

In an important aspect of this invention there is provided sodium-free chemical leavening systems for baked goods comprising leavening acid of this invention as the acid factor and a carbonate factor free of sodium. The sodium content of the human diet has been noted to be desirably controlled because of its link to high blood pressure. Medical experts estimate that about 20 percent of the U.S. population is genetically predisposed to a form of high blood pressure that is sensitive to sodium in the diet. Much effort has been made to prepare low-sodium foods and even no sodium foods particularly with respect to patients suffering from heart disease and edema. It is therefore a particular advantage of the present invention that chemical leavening systems for baked goods are provided which do not contribute sodium to the human diet by consumption of the resultant baked goods. Accordingly, the leavening acid of this invention in combination with sodium free carbonate factor such as potassium bicarbonate provides a leavening system for fresh dough products and resulting baked goods having lower sodium content than can be provided by previous chemical leavening systems containing sodium bicarbonate with acid factors containing sodium.

The chemical leavening system of this invention may be incorporated into a baking powder product conveniently prepared by admixing leavening acid of this invention with a carbonate factor as a dry powder mix. It is well known that baking powders in the dry powder form are best prepared together with fillers contributing to the bulk of the powder and aiding its measurement for actual use. Fillers such as starch or calcium carbonate are generally employed in baking powders of this invention. Conventional preservatives and fillers may be employed together with the baking powder composition of this invention as is known in the art.

Fresh dough and batter can be prepared from the leavening systems of this invention in the conventional manner as has been practiced in the art. Typically the ingredients may be dry mixed or prepared as a dough or batter. The dough or batter may be stored for conventional time periods under refrigeration. The dry mix is employed to prepare fresh dough or batter by incorporating suitable liquids such as milk and shortening materials as is known in the art.

As is known in the art, the desired pH of the final baked good can be controlled by incorporating into fresh dough or batter leavening acids and alkaline carbonate sources normally employed for that purpose in the art. Generally, the pH of the final baked product ranges from about 5.5 to about 9.0, preferably from about 6.9 to about 7.5. The amount of alkaline carbonate material added should provide sufficient carbon dioxide. Typically there is included from about 0.3% by weight to about 3% by weight of the edible, alkaline agent, based upon the weight of the dry ingredients employed.

The typical uses and levels of leavening acid of this invention typically employed therein are provided in the table below. The level of acid used with common, commercially available carbonate factors is an amount sufficient to neutralize and liberate carbon dioxide. The percentages shown are for the amount of calcium acid pyrophosphate of this invention (CAPP).

| USES AND LEVELS OF USE - CAPP | |
|---|---|
| PRODUCT | WT. PERCENT |
| Self-Rising Flour | 1.7–2.2 |
| Self-Rising Corn Meal | 2.2–2.9 |
| Biscuit Mixes | 2.2–2.9 |
| Breading Batter Mixes | 0.0–2.9 |
| Cake Mixes - Layer | 0.9–1.4 |
| Cake Mixes - Angel | 2.2–2.9 |

-continued

| USES AND LEVELS OF USE - CAPP | |
|---|---|
| PRODUCT | WT. PERCENT |
| Cake Doughnut Mixes | 0.7–1.4 |
| Cookie Mixes | 0.0–1.4 |
| Hush Puppy Mixes | 2.2–2.9 |
| Pancake Mixes | 2.2–2.9 |
| Pizza Mixes | 0.4–1.7 |
| Refrigerated Doughs | 2.9–3.6* |
| Frozen Pancake Batter | 2.5–3.2* |
| Frozen Biscuit Doughs | 2.2–2.9* |
| Muffins | 2.2–2.9 |
| Baking Powders | 43.5–58.0 |
| Crackers | 0.7–2.6 |
| Frozen Cake Batter | 0.9–1.8* |

*% of solids

The moisture content of the fresh doughs and batters of the present invention generally range from about 5% by weight to about 130% by weight, based upon the weight of the dry ingredients. The moisture content will vary, dependent upon the ultimate utility of the dough or batter as to whether it may be employed to prepare cookies, biscuits, cakes, etc.

Baking times of the fresh doughs or batters of this invention are generally within the baking times generally known in the art with respect to the use of previously known leavening systems. It is typical that various mixes of fresh dough will require different baking times considering as well the baking characteristics of the ovens employed. Typical baking times range from 7 to 15 minutes for cookies and longer periods for biscuits and other baked goods. The doughs of the present invention are formed into pieces in conventional manner, using known bakery equipment such as wire cutting devices, rotary cutters, reciprocating cutters, and the like.

Typically, fresh dough is prepared as in the prior art from flour, shortening, sugar, optionally emulsifiers and preservatives and from about 0.5% by weight to about 3.9% by weight of a leavening system of this invention. Other optional ingredients, of course, can be included as is well known in the art.

The fresh doughs and batters of the present invention can optionally include many substances known in the art to be added to fresh dough including bulking agents such as dietary fiber and hydrocolloides, corn fiber, soy flitrate, wheat bran, and apple tomace fiber (dehydrated and freeze dried) as exemplary of dietary fibers.

Texturizing and flavoring ingredients conventionally used in the production of baked goods may be employed in the novel doughs of this invention. The amounts employed are generally comparable to those used in the conventional formulation so as to achieve satisfactory mouthfeel, texture and taste. Typical amounts of conventional texturizing and flavoring ingredients used in the production of baked goods are in the range of from about 5% by weight up to about 25% by weight of the fresh dough. Other additives such as sweeteners, etc. can also be employed in combination with the novel leavening system of this invention.

DESCRIPTION OF THE PREFERRED EMBODIMENTS

Example 1

The calcium acid pyrophosphate of this invention can be prepared by the method of E. H. Brown et al. as described in Agricultural and Food Chemistry, Vol. 11, No. 3, May-June 1963 which is incorporated herein by reference. The calcium acid pyrophosphate of this invention was prepared according to said method by heating 1,275 g of reagent grade 86% phosphoric acid in a glass beaker to 210°±10° C. with vigorous stirring which was continued throughout the preparation to prevent supersaturation. A first portion of monocalcium phosphate monohydrate (112 g) was added slowly at the rate of 2.5–3 g/minute until the first crystals appeared. Precipitation was aided by either seeding or scratching the beaker with a glass rod to prevent supersaturation. A second portion of 112 g of monocalcium phosphate monohydrate was then added at a rate of addition of less than 0.75 g per minute until a reasonably thick suspension was obtained. The hot mixture was filtered immediately by suction on a fritted-glass filter. The crystals were cooled and washed with acetone and allowed to air dry. About 142 g of calcium acid pyrophosphate was obtained. The crystal size of the product obtained was measured and found to average in the range of from about 5 to about 20 microns and were plate-like or tabular in appearance. X-ray diffraction of the crystals was consistent with the pattern indicated by Brown et al., supra, and also with Morin, Bull. Soc. Chim. France, 1726 (1961). The above procedure was repeated twice and the products obtained marked as Example 1A and Example 1B in the following table and attached graphs.

Example 2

The procedure of Example 1 was repeated except that a total of 95.6 g calcium carbonate was employed in place of the monocalcium phosphate monohydrate to prepare the calcium acid pyrophosphate.

Example 3

The procedure of Example 1 was repeated except that the temperature of the phosphoric acid during addition of the calcium phosphate was 170° C. instead of 210° C.

Example 4

The procedure of Example 1 was repeated except that the amount of monocalcium phosphate monohydrate added to the phosphoric acid was reduced by a factor of 25%.

Example 5

The procedure of Example 1 was repeated with the exception that the amount of monocalcium phosphate monohydrate added to the phosphoric acid was increased by a factor of 25%.

There is shown below in Table 1 the physical description of the products of Examples 1–5. In the table, yield is based upon the weight of monocalcium orthophosphate and $t_{\frac{1}{2}}$, min. is the midpoint in minutes of the delayed increase in reaction rate at constant temperature. The delay is the time at which the reaction rate increase begins. Also shown in Table 1 is available data for calcium acid pyrophosphate which was obtained from Benckiser-Knapsack, GmbH, Ladenburg Germany (BKL).

TABLE 1

| | Ex 1A | Ex 1B | Ex 1 | BKL |
|---|---|---|---|---|
| Particle Size, Mean. Vol. Dia., micron | 15.9 | 19.4 | 5.0 | 56 |
| H, wt % | 0.71 | 0.85 | 0.90 | 1.00 |

TABLE 1-continued

|  |  |  |  |  |
|---|---|---|---|---|
| CaO/P$_2$O$_5$, mole ratio | 0.965 | 0.980 | 0.900 | 1.056 |
| Yield, $\frac{\text{wt. CAPP}}{\text{wt. MCP}}$ | 0.27 | 0.58 | 0.71 | na |
| t$_{\frac{1}{2}}$, min. 40° C. | 38 | 26 | 20 | na |
| delay, min., @ 40° C. | 14 | 10 | 10 | na |
| $\frac{\% \text{ CO}_2 \text{ @ 60 minutes}}{\% \text{ CO}_2 \text{ @ 3 min. @ 40° C.}}$ | 2.47 | 2.89 | 2.98 | 1.93 |

|  | Ex 2 | Ex 3 | Ex 4 | Ex 5 |
|---|---|---|---|---|
| Particle Size, Mean. Vol. Dia., micron | 9.8 | 16.2 | 11.0 | 10.0 |
| H, wt % | 0.80 | 0.87 | 0.89 | 0.81 |
| CaO/P$_2$O$_5$, mole ratio | 1.017 | 0.983 | 0.973 | 0.991 |
| Yield, $\frac{\text{wt. CAPP}}{\text{wt. MCP}}$ | (0.64)$^2$ | 0.68 | 0.10 | 0.63 |
| t$_{\frac{1}{2}}$, min. @ 40° C. | 23 | 12 | 9 | 29 |
| delay, min., @ 40° C. | 10 | 5 | 4 | 16 |
| $\frac{\% \text{ CO}_2 \text{ @ 60 min.}}{\% \text{ CO}_2 \text{ @ 3 min. @ 40° C.}}$ | 2.82 | 2.38 | 2.18 | 2.85 |

$^1$monohydrate
$^2$calcium carbonate employed and yield calculated on the basis of MCP equivalent Example 6

The product of Example 1 was employed as the acid factor in a leavening system of a white cake mix. To 657,036 g of Roland A-1 White Cake Mix obtained commercially from Roland Industries, St. Louis, Mo. was added and dry blended with 5.293 g of sodium bicarbonate, Grade 2 and 7,671 g of the product of Example 1. To the dry mix was added 83 g of water and the mixture blended to a uniform mixture. An additional 99 g of water was then added and the batter mixed at higher speed for 1 minute. After scraping down the sides and bottom, the batter was mixed for an additional minute at the same speed. Then, after again scraping down the sides and bottom, an additional 74 g of water was added followed by mixing at slower speed for 1 minute. A sample was taken for determination of specific gravity and then 420 g of batter was deposited in a prepared pan with liner. The cake was baked for 33 minutes in an oven at 350° F. The baked cake was then taken from the oven and allowed to cool before evaluation. Specific gravity of the batter was determined to be 0.8743 g per 100 ml. The specific volume of the cake (rapeseed) was 2.35 cc/g. In a penetration test a total weight of 212 g was placed near each edge and center of the cake for a period of 5 seconds. Penetration (in 0.1 mm) was measured as 38 and 39 on the edges and 42 was observed at the center. The pH of the cake was found to be 9.0.

Example 7

The product of Example 1 was employed as the acid factor in a leavening system of a pancake batter. To a bowl was added 237.14 g of Roland Pancake Base Mix. Separately, 5.25 g of sodium bicarbonate and 7.61 g of the product of Example 1 were placed into a tared boat. The mixture of leavening acid and soda were sprinkled over the mix and incorporated with a whisk. Then 263.5 g of water were added to the mix and blended with a whisk. A sample was taken for specific gravity measurement. Into a 100 ml graduated cylinder was added 50 ml of the batter. The volume in the cylinder was noted at 5, 10, 15, and 30 minutes for expansion. Then, one level #24 scoop of batter was poured onto a heated griddle maintained at 375° F. making eight pancakes. The pancakes were baked for 1.5 minutes land then turned over and baked for an additional 1.5 minutes. After baking they were removed from the griddle and evaluated. The specific gravity of the batter was determined to be 1.017 g/cc. The pH of the batter was found to be 7.34 after 1 minute and 7.0 after 30 minutes. The observed volume in the graduated cylinder at the various time intervals is as follows:

| Time (min.) | Volume (ml) | % expansion |
|---|---|---|
| start | 50 | 0 |
| 5 | 50 | 0 |
| 10 | 52 | 4 |
| 15 | 59 | 18 |
| 30 | 85 | 70 |

The pH of the pancakes, internal was determined to be 8.5. A stack of 3 pancakes provided a specific volume of 2.563 cc/g and a ratio of diameter to height of 1.0395. The crust color was golden brown and the crumb color was yellow. The taste was sweet and acceptable.

DETAILED DESCRIPTION OF THE DRAWINGS

By employing the DRR test described above, various leavening systems have been investigated and the results shown graphically in the attached drawings. While the Parks et al. publication referred to above provides a general procedure, the following specific conditions were employed in the tests producing the data observed in the attached drawing:

| Mixing time: | 3 minutes |
|---|---|
| Total CO$_2$ release time: | 60 min. |
| Dough Ingredients: | |
| Pinnacle Cake Flour (12.5% H$_2$O) | 57 g |
| Non-Fat Dry Milk | 3.7 g |
| Sodium Bicarbonate | 0.755 g |
| Leavening Acid | 1.0942* g |
| water | 43 g |

*Added at the rate of 1.45 parts per part of sodium bicarbonate.

Figure 1A:
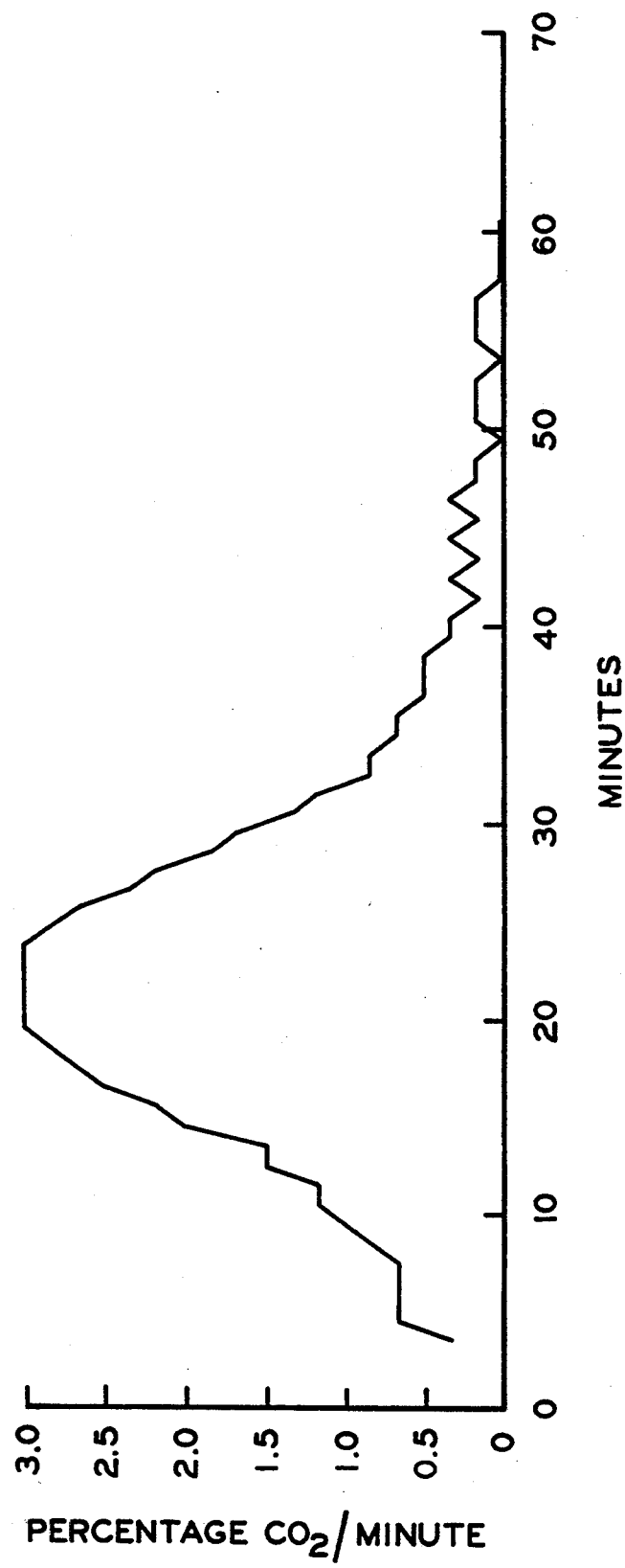

In FIG. 1 there is shown the results of the DRR test employing calcium acid pyrophosphate of Example 1 as the acid factor in the leavening system. The DRR test was run as 21° C. (line A), 40° C. (line B) and 48° C. (line C). The amount of carbon dioxide released from the dough as a percent of the theoretical amount available from the leavening system is indicated as percent and the time lapse from initiation of mixing the ingredients is shown in minutes. The data obtained in the above test at the different temperatures and graphically displayed in FIG. 1 are listed below in Table 2. In FIG. 1A there is shown the minute differential data based on the data obtained in the DRR test at 40° C.

TABLE 2

| | Percent of Available Carbon Dioxide | | |
|---|---|---|---|
| Time (Min.) | 21° C. | 40° C. | 48° C. |
| 1 | 17.55 | 25.22 | 26.12 |
| 2 | 24.33 | 31.21 | 32.00 |
| 3 | 27.52 | 34.60 | 35.39 |
| 4 | 28.22 | 35.59 | 36.59 |
| 5 | 28.42 | 36.09 | 37.29 |

TABLE 2-continued

| | Percent of Available Carbon Dioxide | | |
|---|---|---|---|
| Time (Min.) | 21° C. | 40° C. | 48° C. |
| 10 | 29.21 | 39.68 | 43.87 |
| 15 | 30.21 | 47.66 | 58.33 |
| 20 | 32.00 | 61.12 | 73.98 |
| 25 | 35.00 | 73.98 | 82.55 |
| 30 | 39.78 | 81.65 | 86.34 |
| 35 | 46.76 | 85.54 | 88.24 |
| 40 | 54.84 | 87.34 | 89.33 |
| 45 | 62.01 | 88.43 | 90.03 |
| 50 | 67.80 | 89.13 | 90.63 |
| 55 | 71.69 | 89.63 | 91.03 |
| 60 | 74.38 | 90.03 | 91.43 |

As can be seen in FIG. 1, the reaction profile for the calcium acid pyrophosphate of Example 1 indicated a change in rate occurring at time periods after initial mixing. After initial mixing there is a relatively low rate of reaction and then, without change in temperature, a rapid change in reaction rate is observed, as indicated by an increase in carbon dioxide production. At 40° C., the maximum rate of carbon dioxide release ($t_{\frac{1}{2}}$) occurs at 20 minutes after initial mixing.

Figure 2:
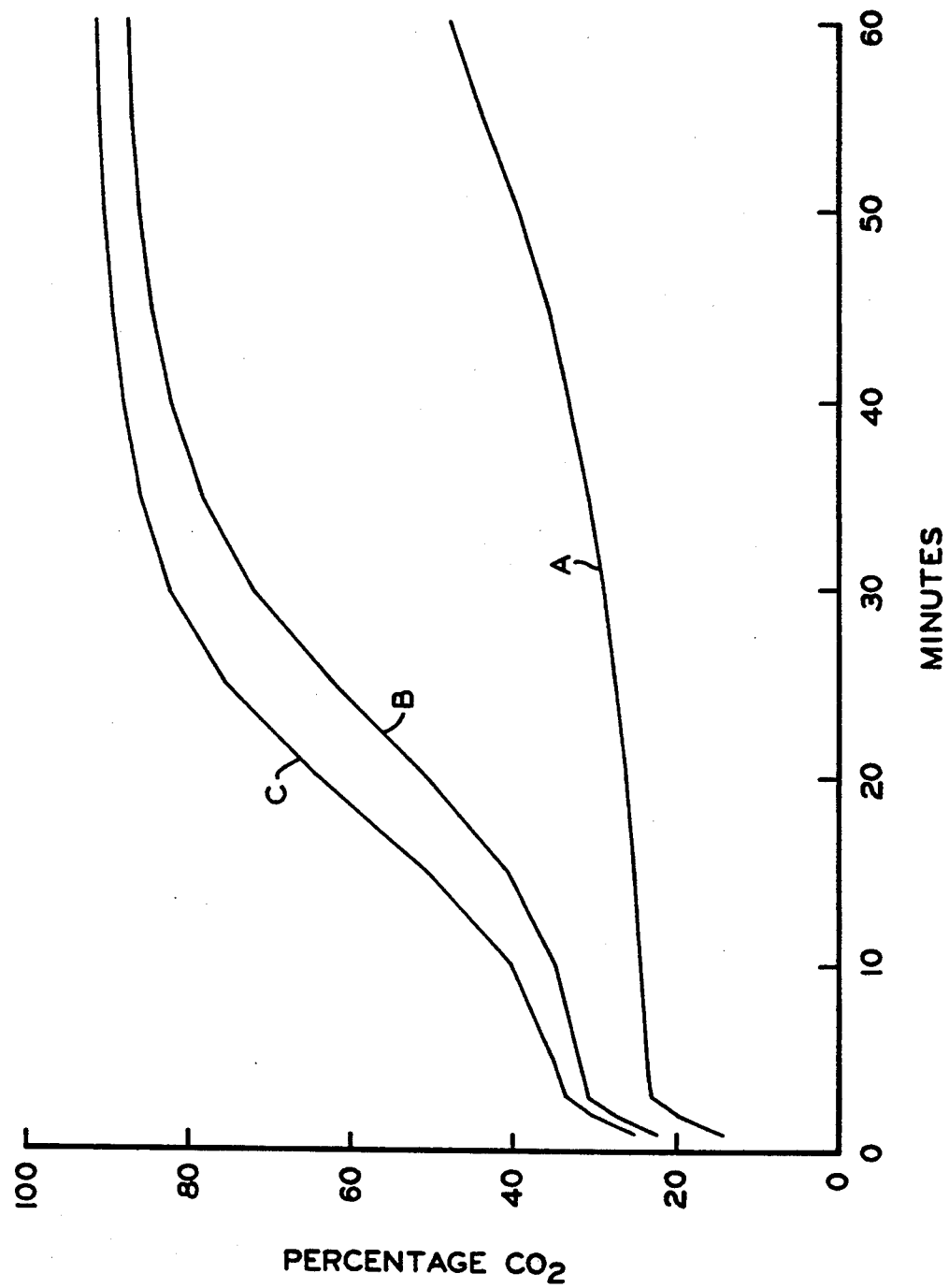
FIG. 2 shows the result of the DRR test employing a leavening system of this invention wherein a different calcium ion source (calcium carbonate) is provided during preparation of the calcium acid pyrophosphate of this invention.

In FIG. 2 there is shown the results of the DRR test employing calcium acid pyrophosphate of Example 2 as the acid factor in the leavening system. The DRR test was run at 21° C. (line A), 40° C. (line B) and 48° C. (line C). In FIG. 2 there is indicated the amount of carbon dioxide released from the dough as a percent of the theoretical amount available from the leavening system during the time lapse from initiation of mixing the ingredients, shown in minutes. The data obtained in the above DRR test at the different temperatures and graphically displayed in FIG. 2 are listed below in Table 3.

TABLE 3

| Time (Min.) | 21° C. | 40° C. | 48° C. |
|---|---|---|---|
| 1 | 14.26 | 22.63 | 25.22 |
| 2 | 19.74 | 27.92 | 30.41 |
| 3 | 23.03 | 31.01 | 33.70 |
| 4 | 23.33 | 31.51 | 34.40 |
| 5 | 23.53 | 32.00 | 35.10 |
| 10 | 24.43 | 35.00 | 40.28 |
| 15 | 25.22 | 40.98 | 50.75 |
| 20 | 26.12 | 50.75 | 64.01 |
| 25 | 27.32 | 61.91 | 75.07 |
| 30 | 28.81 | 71.69 | 81.95 |
| 35 | 30.71 | 78.17 | 85.54 |
| 40 | 32.90 | 82.05 | 87.74 |
| 45 | 35.69 | 84.35 | 89.13 |
| 50 | 39.28 | 85.84 | 90.03 |
| 55 | 43.67 | 86.74 | 90.63 |
| 60 | 47.86 | 87.34 | 91.13 |

Figure 2A:
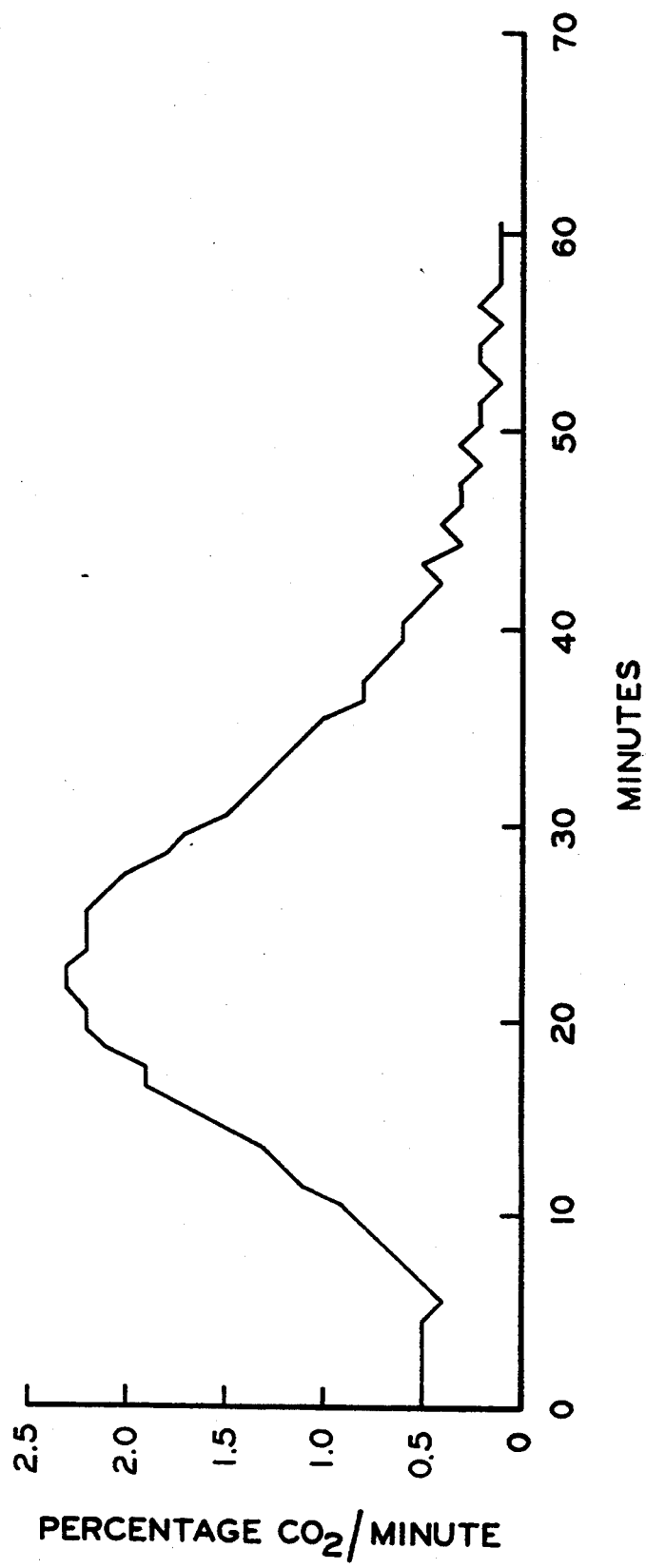

As can be seen in FIG. 2, the reaction profile for the calcium acid pyrophosphate of Example 2 indicated a change in rate occurring at time periods after initial mixing, the maximum rate occurring at approximately 23 minutes at 40° C. After initial mixing there is observed a relatively low rate of reaction and then, without change in temperature, a rapid change in reaction rate is observed, as indicated by an increase in carbon dioxide production. In FIG. 2A there is shown the minute differential obtained from the data collected in the above mentioned DRR test at 40° C.

Figure 3:
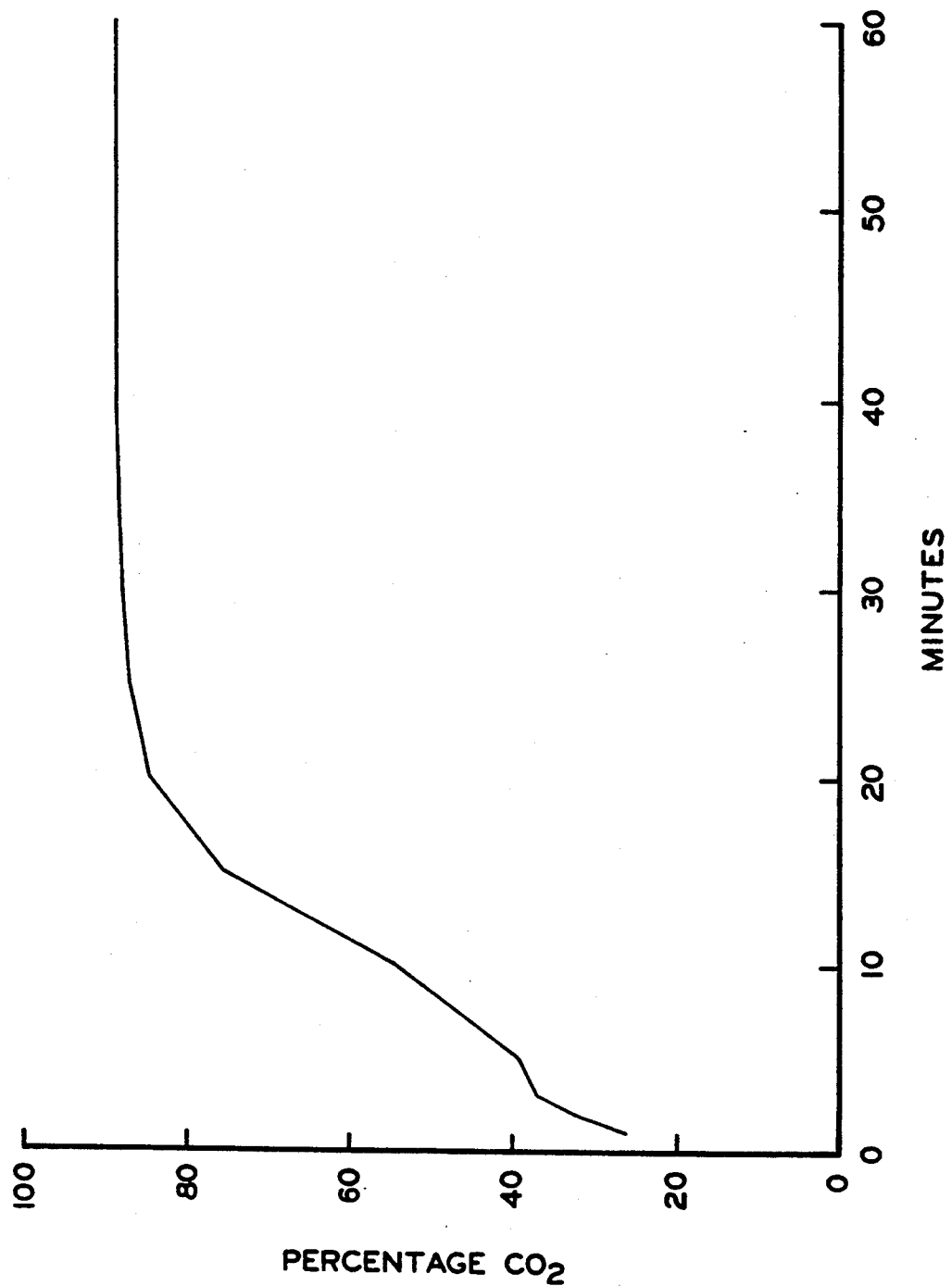
FIGS. 3-5 show the results of the DRR test employing a leavening system containing calcium acid pyrophosphate which was obtained by employing variations in the procedure for reacting a calcium source and phosphoric acid.
Figure 3A:
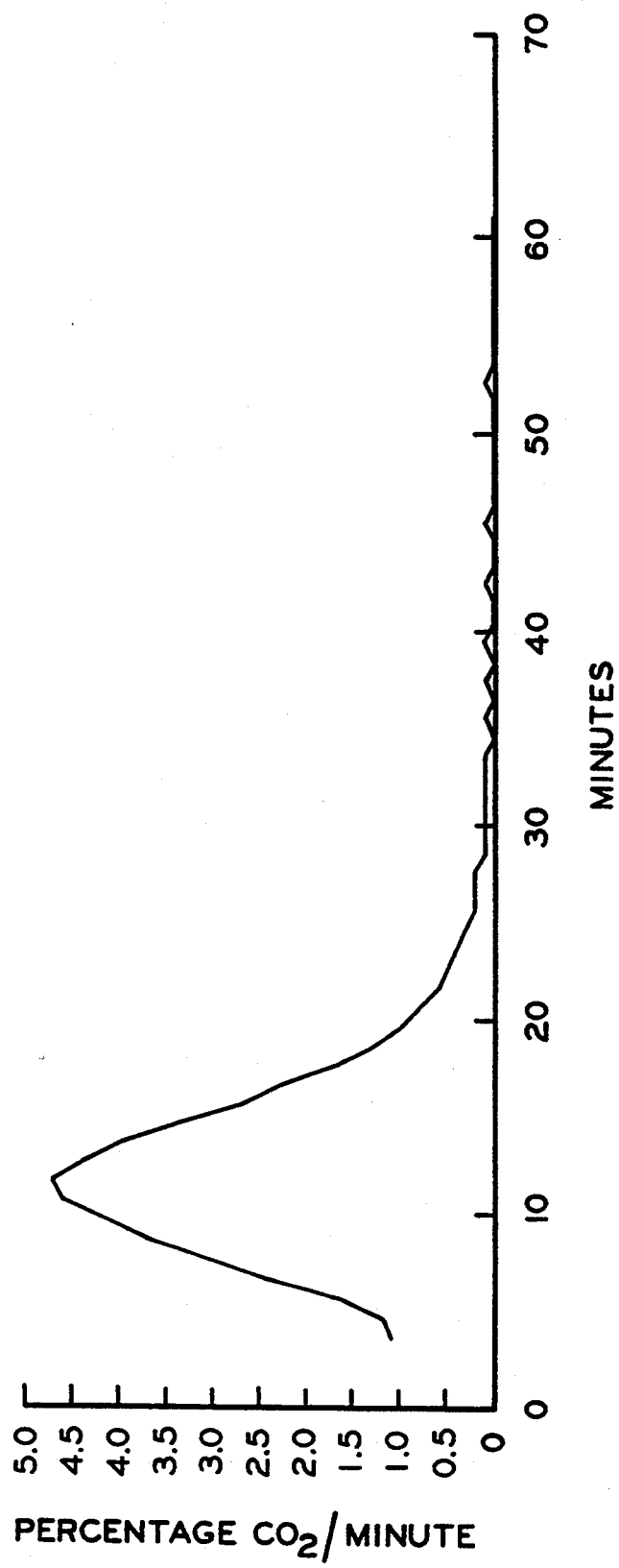

In FIG. 3 there is shown the results of the DRR test employing a leavening system in which the calcium acid pyrophosphate of Example 3 was employed. Data was obtained at 40° C. only in this test. The data obtained to provide FIG. 3 are presented below in Table 4. In FIG. 3A there is shown the minute differential obtained from the data collected in the above-mentioned DRR test at 40° C. The $t_{\frac{1}{2}}$ point in the curves in FIGS. 3 and 3A occurs at 12 minutes; therefore, not within the scope of this invention.

TABLE 4

| Time (Min.) | 40° C. |
|---|---|
| 1 | 26.42 |
| 2 | 32.70 |
| 3 | 37.19 |
| 4 | 38.29 |
| 5 | 39.48 |
| 10 | 54.24 |
| 15 | 75.27 |
| 20 | 84.25 |
| 25 | 86.84 |
| 30 | 87.64 |
| 35 | 88.04 |
| 40 | 88.34 |
| 45 | 88.43 |
| 50 | 88.53 |
| 55 | 88.63 |
| 60 | 88.63 |

Figure 4:
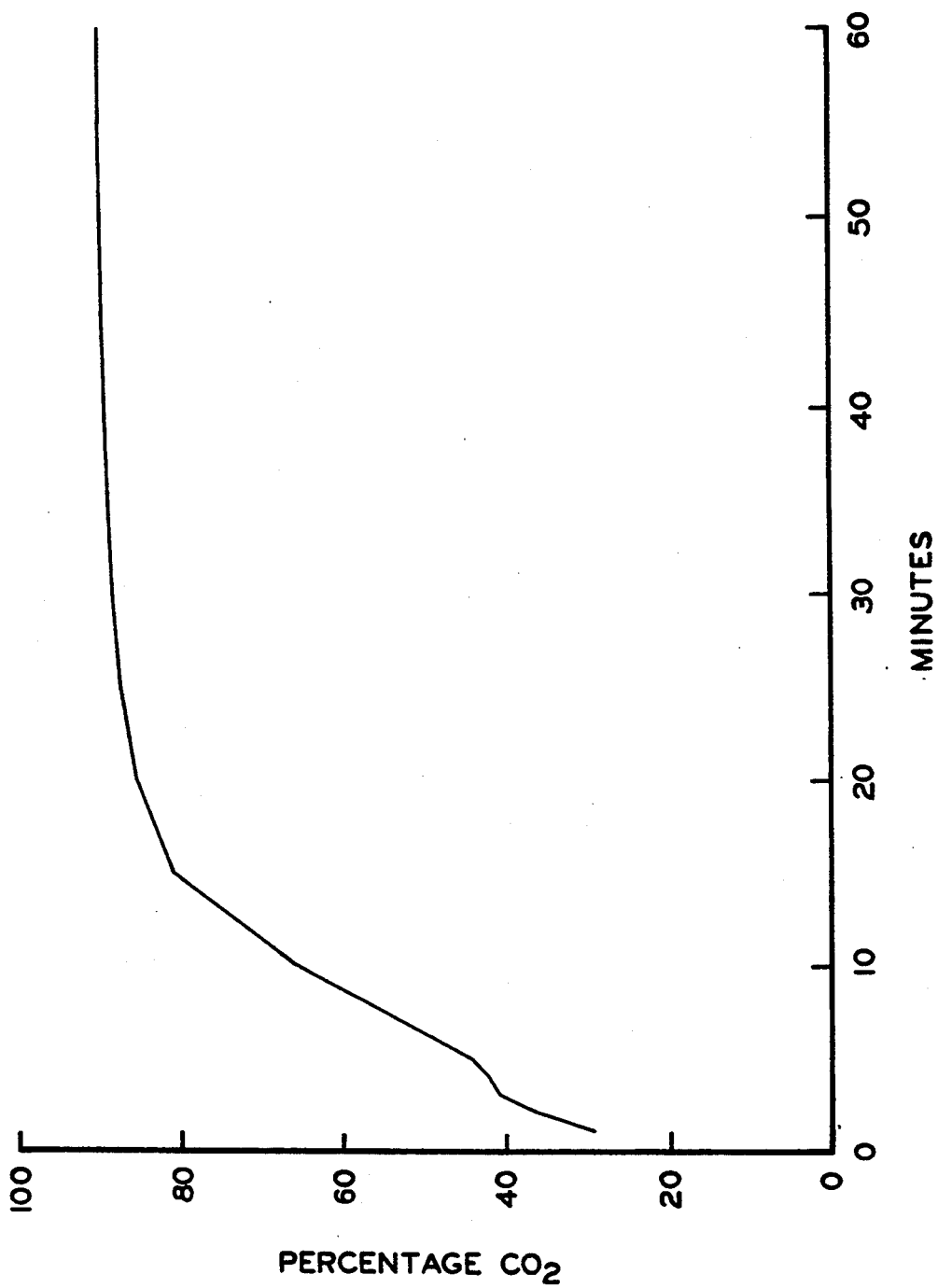
Figure 4A:
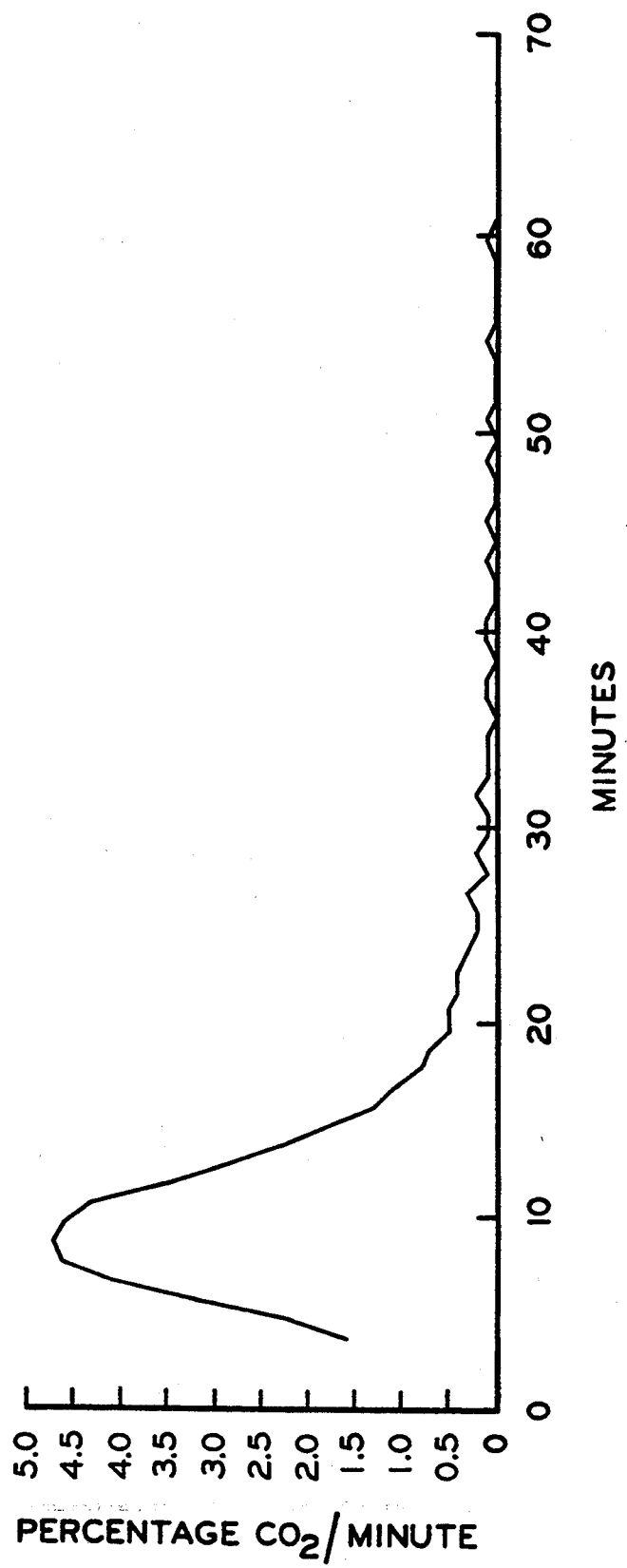

In FIG. 4 there is shown the results of the DRR test employing a leavening system in which the calcium acid pyrophosphate of Example 4 was employed. Data was obtained at 40° C. only in this test. The data obtained to provide FIG. 4 are presented below in Table 5. In FIG. 4A there is shown the minute differential obtained from the data collected in the above-mentioned DRR test at 40° C. The $t_{\frac{1}{2}}$ point in the curves in FIGS. 4 and 4A occurs at 9 minutes; therefore, not within the scope of this invention.

TABLE 5

| Time (Min.) | 40° C. |
|---|---|
| 1 | 29.61 |
| 2 | 36.39 |
| 3 | 41.08 |
| 4 | 42.67 |
| 5 | 44.87 |
| 10 | 66.00 |
| 15 | 80.76 |
| 20 | 85.14 |
| 25 | 86.94 |
| 30 | 87.84 |
| 35 | 88.43 |
| 40 | 88.73 |
| 45 | 88.93 |
| 50 | 89.13 |
| 55 | 89.33 |
| 60 | 89.43 |

Figure 5:
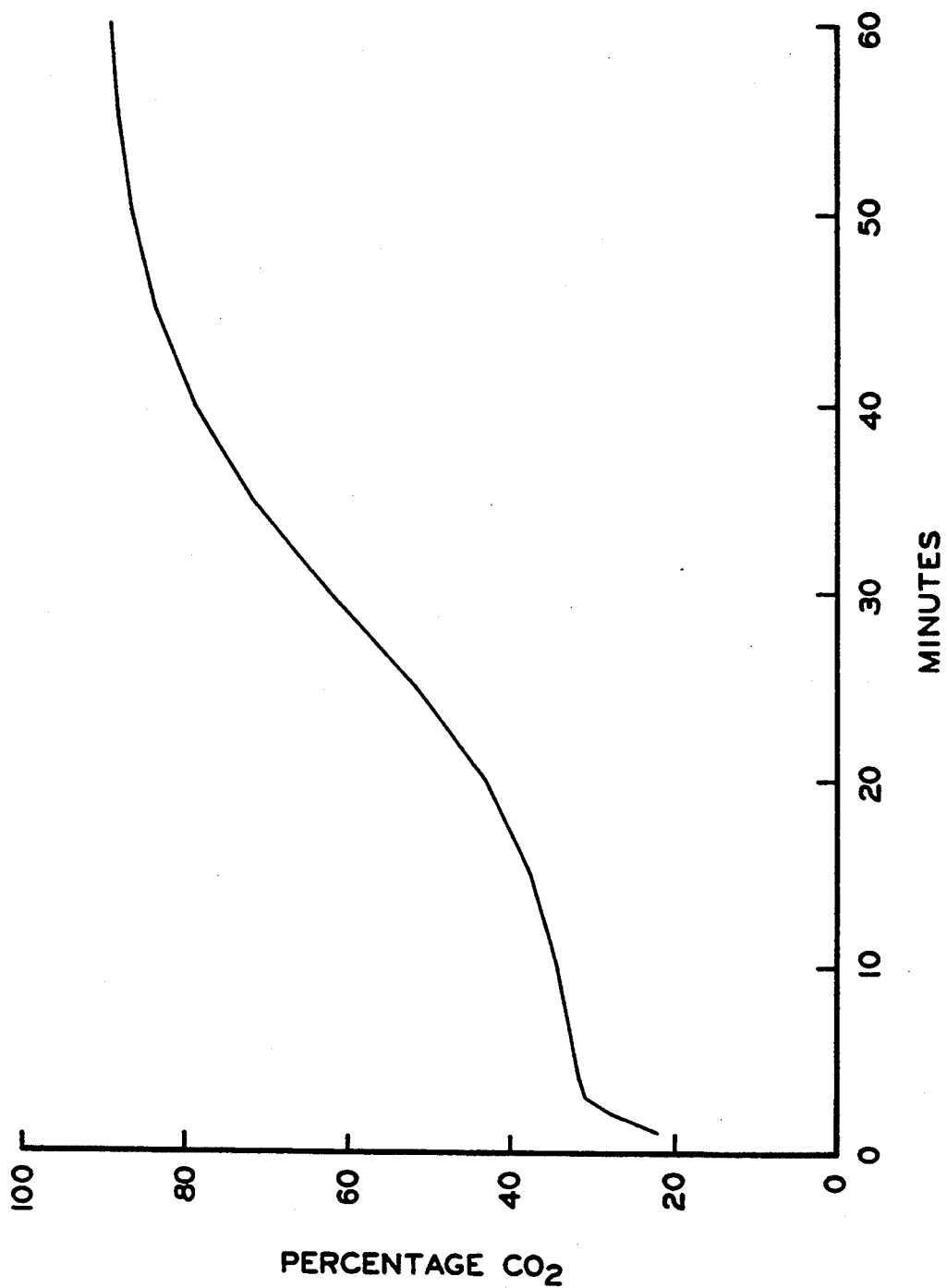
Figure 5A:
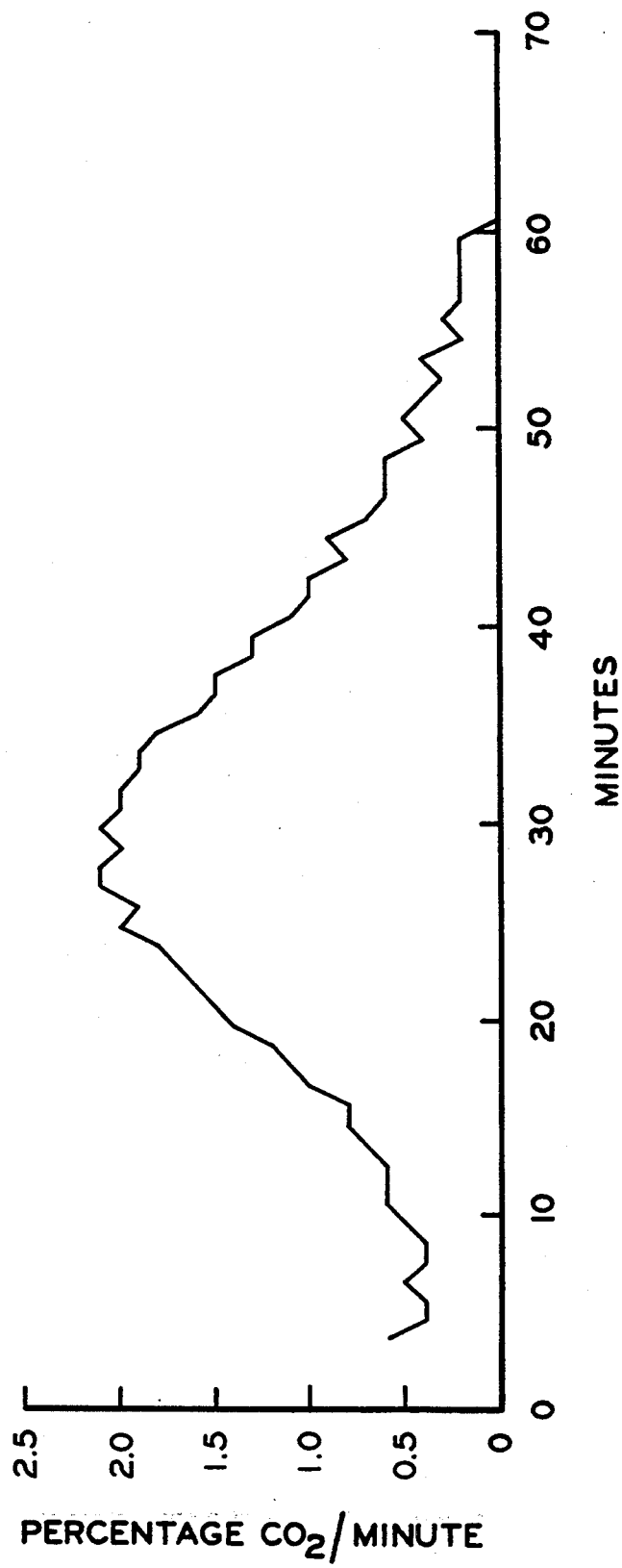

In FIG. 5 there is shown the results of the DRR test employing a leavening system in which the calcium acid pyrophosphate of Example 5 was employed. Data was obtained at 40° C. only in this test. The characteristic rapid increase in the rate of carbon dioxide production is observed about 29 minutes after initial mixing. This indicates that higher ratios of the calcium ion source to phosphoric acid in the reaction producing the calcium acid pyrophosphate of this invention affects the timing of carbon dioxide release in a leavening system. The data obtained to provide FIG. 5 are presented below in Table 6. In FIG. 5A there is shown the minute differential obtained from the data collected in the above-mentioned DRR test at 40° C.

TABLE 6

| Time (Min.) | 40° C. |
|---|---|
| 1 | 22.53 |

TABLE 6-continued

| Time (Min.) | 40° C. |
| --- | --- |
| 2 | 28.12 |
| 3 | 31.31 |
| 4 | 31.90 |
| 5 | 32.30 |
| 10 | 34.50 |
| 15 | 37.79 |
| 20 | 43.27 |
| 25 | 51.84 |
| 30 | 62.01 |
| 35 | 71.59 |
| 40 | 78.76 |
| 45 | 83.55 |
| 50 | 86.44 |
| 55 | 88.24 |
| 60 | 89.33 |

Figure 6:
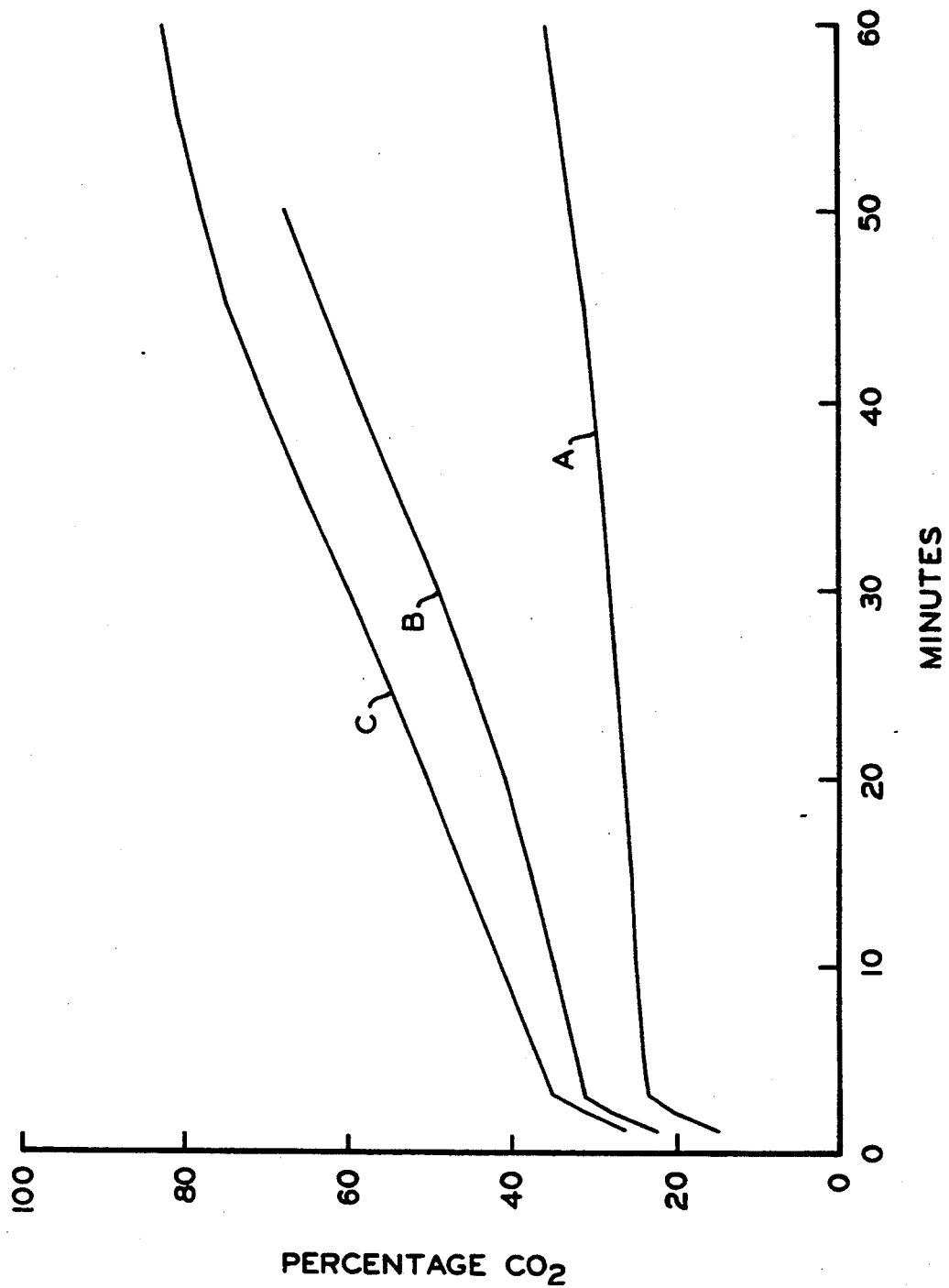
FIGS. 6 and 7 show the results of the DRR test employing a leavening system of this invention provided by Examples 1A and 1B.
Figure 6A:
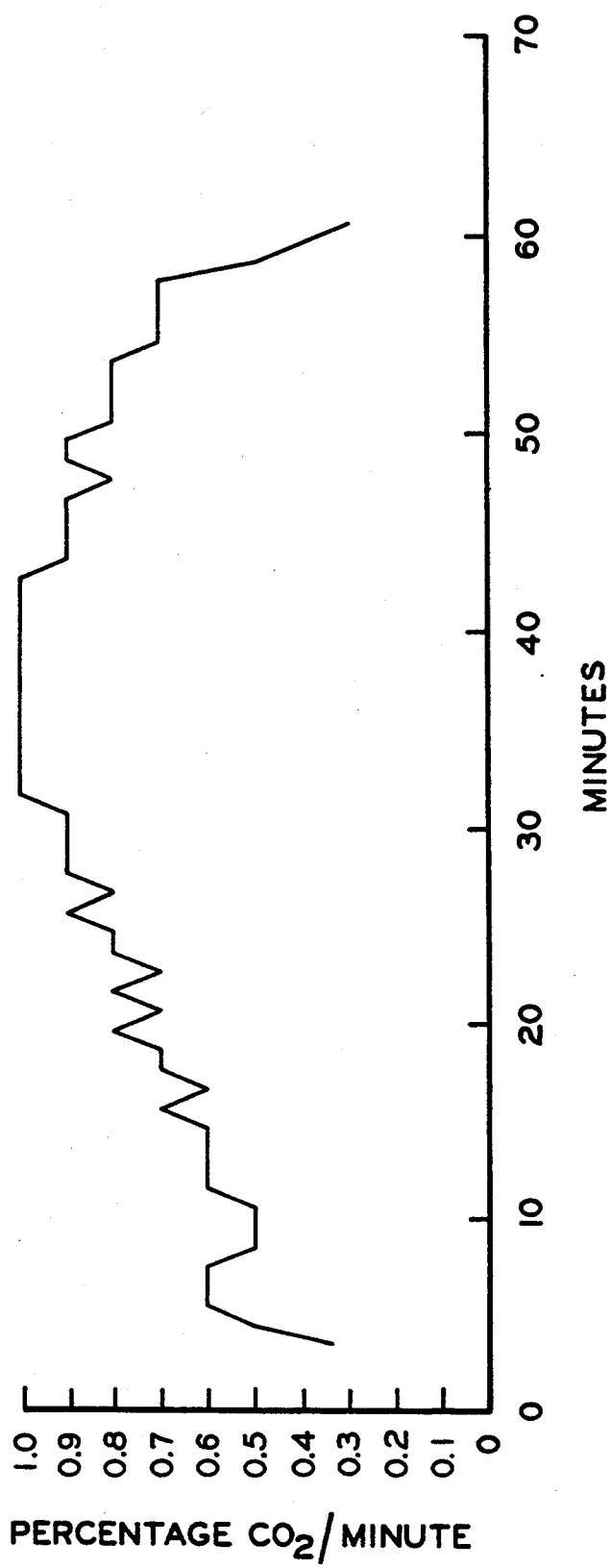

In FIG. 6 there is shown the results of the DRR test employing a leavening system in which the calcium acid pyrophosphate of Example 1A was employed. The DRR test was at 21° C. (line A), 40° C. (line B), and 48° C. (line C). The characteristic rapid increase in the rate of carbon dioxide production is observed. The data obtained to provide FIG. 6 are presented below in Table 7. In FIG. 6A there is shown the minute differential obtained from the data collected in the above-mentioned DRR test at 40° C. The $t_{\frac{1}{2}}$ point in the curves in FIGS. 3 and 3A occurs at 38 minutes; therefore, is within the scope of this invention.

TABLE 7

| Time (min) | 21° C. | 40° C. | 48° C. |
| --- | --- | --- | --- |
| 1 | 14.70 | 22.30 | 25.90 |
| 2 | 20.10 | 28.00 | 31.00 |
| 3 | 23.20 | 31.20 | 34.90 |
| 4 | 23.60 | 31.80 | 36.00 |
| 5 | 23.90 | 32.30 | 37.00 |
| 10 | 24.80 | 35.00 | 41.30 |
| 15 | 25.40 | 37.80 | 45.90 |
| 20 | 26.20 | 40.90 | 50.30 |
| 25 | 27.00 | 44.80 | 55.00 |
| 30 | 28.00 | 49.00 | 60.00 |
| 35 | 29.00 | 53.80 | 65.20 |
| 40 | 30.10 | 58.80 | 70.20 |
| 45 | 31.30 | 63.30 | 74.80 |
| 50 | 32.90 | 67.80 | 78.10 |
| 55 | 34.40 |  | 80.90 |
| 60 | 36.00 |  | 83.00 |

Figure 7:
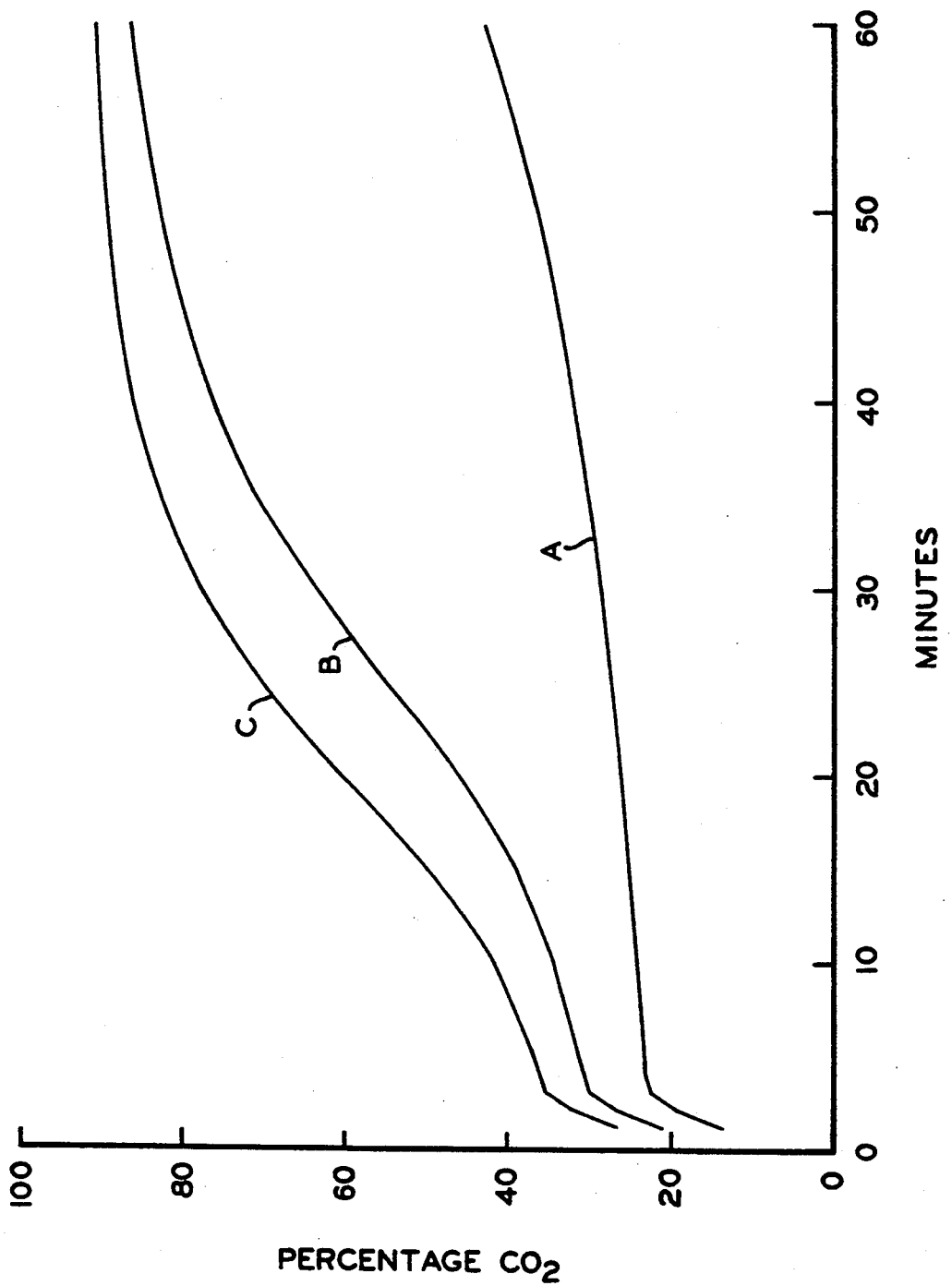
Figure 7A:
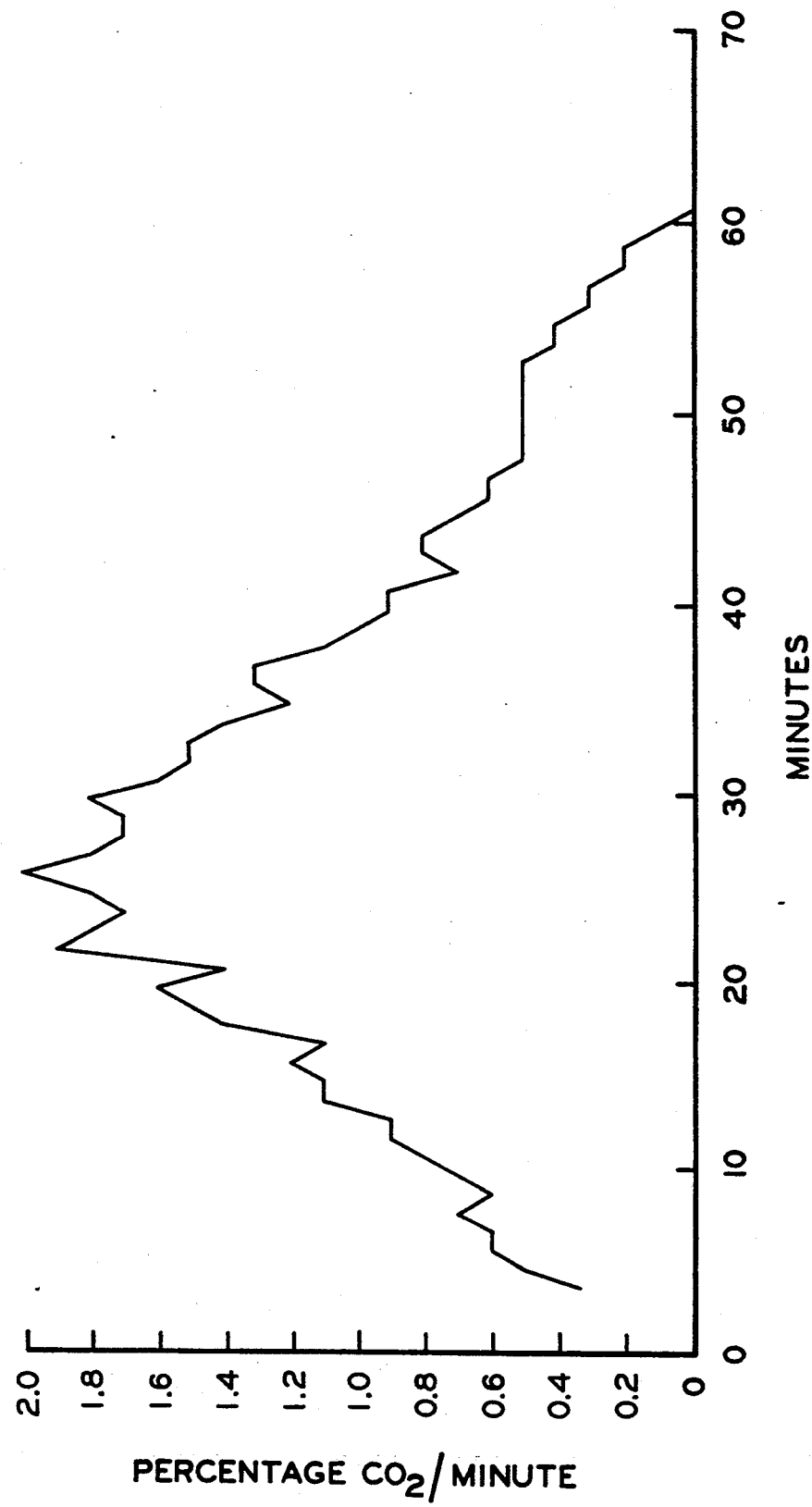

In FIG. 7 there is shown the results of the DRR test employing a leavening system in which the calcium acid pyrophosphate of Example 1B was employed. The DRR test was run at 21° C. (line A), 40° C., (line B) and 48° C. (line C). The characteristic rapid increase in the rate of carbon dioxide production is observed. The data obtained to provide FIG. 7 are presented below in Table 8. In FIG. 7A there is shown the minute differential obtained from the data collected in the above-mentioned DRR test at 40° C. The $t_{\frac{1}{2}}$ point in the curves in FIGS. 7 and 7A occurs at 26 minutes; therefore, is within the scope of this invention.

TABLE 8

| Time (Min) | 21° C. | 40° C. | 48° C. |
| --- | --- | --- | --- |
| 1 | 13.50 | 21.10 | 26.30 |
| 2 | 19.10 | 26.80 | 31.90 |
| 3 | 22.20 | 30.00 | 35.20 |
| 4 | 22.80 | 30.80 | 36.00 |
| 5 | 23.00 | 31.10 | 36.80 |
| 10 | 24.00 | 34.30 | 41.70 |
| 15 | 24.90 | 39.00 | 50.00 |
| 20 | 25.90 | 46.10 | 60.50 |
| 25 | 27.00 | 55.00 | 70.20 |

TABLE 8-continued

| Time (Min) | 21° C. | 40° C. | 48° C. |
| --- | --- | --- | --- |
| 30 | 28.40 | 63.50 | 77.70 |
| 35 | 30.00 | 71.00 | 82.70 |
| 40 | 31.90 | 76.30 | 86.00 |
| 45 | 33.90 | 80.20 | 88.00 |
| 50 | 36.30 | 83.10 | 89.50 |
| 55 | 39.30 | 85.20 | 90.60 |
| 60 | 42.90 | 86.80 | 91.20 |

Figure 8:
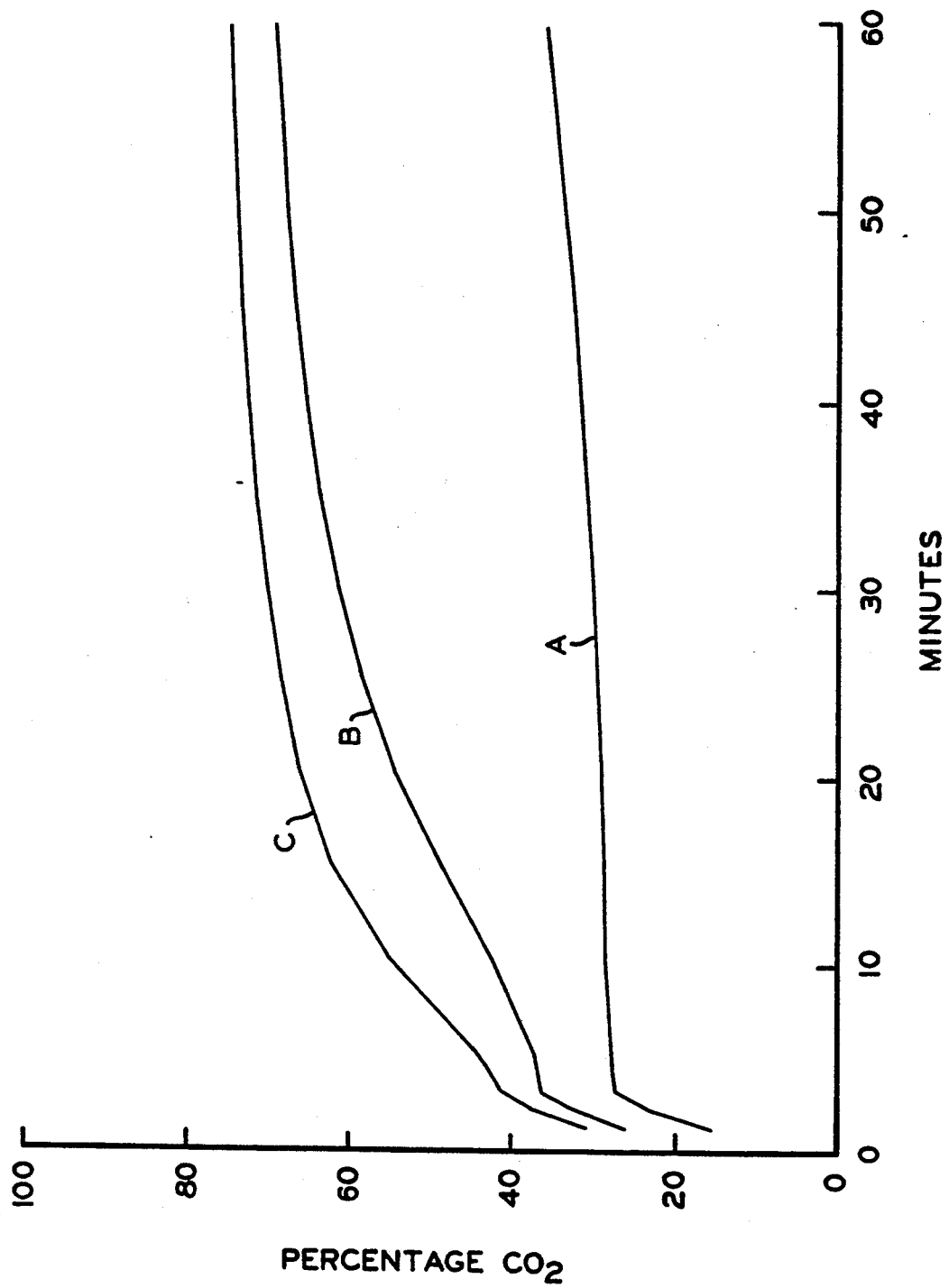
FIG. 8 shows the results of the DRR test employing a comparable leavening system employing a calcium acid pyrophosphate of the prior art.
Figure 8A:
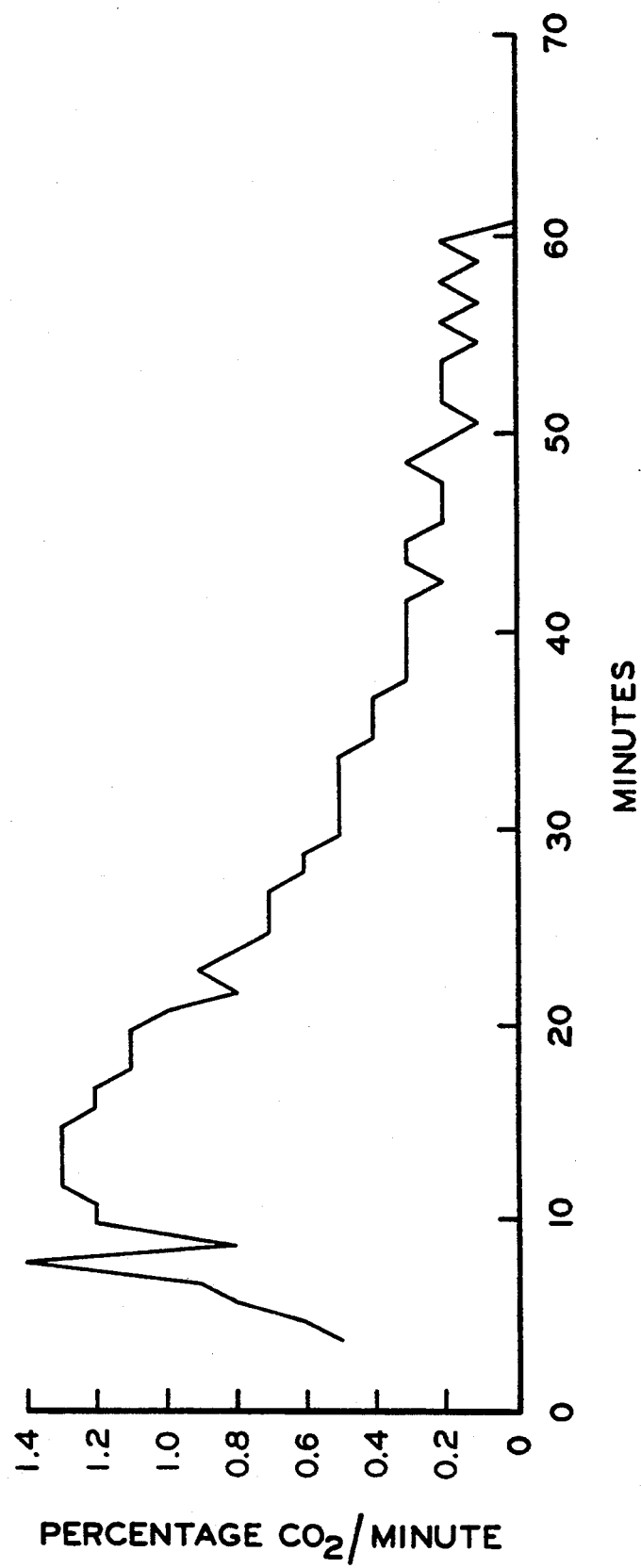

In FIG. 8 there is shown the results of the DRR test employing the above dough formula and conditions with calcium acid pyrophosphate obtained from BKL. An analysis of this product by x-ray diffraction indicated that it contained small amounts of monocalcium phosphate. Other available information about the material is provided in Table 1 above. The same amount of the commercial material was employed in the dough formulation as the acid factor in the DRR as was employed above to produce the data shown in FIG. 1. As in the other tests, the DRR test was run at 21° C. (line A), 40° C., (line B) and 48° C. (line C). The results of the DRR test, as shown in FIG. 8, indicates a fast reaction rate followed by little to no delayed increase in rate. The data obtained in the above test at the different temperatures and graphically displayed in FIG. 8 are listed below in Table 9 below. In FIG. 8A there is shown the minute differential obtained from the data collected in the above-mentioned DRR test at 40° C. The $t_{\frac{1}{2}}$ point in the curves in FIGS. 8 and 8A occurs at 13 minutes. Also, the maximum rate of release is less than twice the rate observed at the termination of mixing and is, therefore, not within the scope of this invention.

TABLE 9

| Temp °C.-Time (Min.) | Percent of Available Carbon Dioxide | | |
| --- | --- | --- | --- |
|  | 21° C. | 40° C. | 48° C. |
| 1 | 15.25 | 26.12 | 30.71 |
| 2 | 22.83 | 32.70 | 37.09 |
| 3 | 27.12 | 36.29 | 41.18 |
| 4 | 27.52 | 36.79 | 42.47 |
| 5 | 27.72 | 37.39 | 44.17 |
| 10 | 28.51 | 42.47 | 55.23 |
| 15 | 28.61 | 48.85 | 62.51 |
| 20 | 28.91 | 54.54 | 66.40 |
| 25 | 29.41 | 58.72 | 68.79 |
| 30 | 29.91 | 61.81 | 70.59 |
| 35 | 30.71 | 64.21 | 71.98 |
| 40 | 31.51 | 65.90 | 72.98 |
| 45 | 32.40 | 67.30 | 73.78 |
| 50 | 33.40 | 68.39 | 74.48 |
| 55 | 34.60 | 69.19 | 75.07 |
| 60 | 35.79 | 69.99 | 75.57 |

Figure 9:
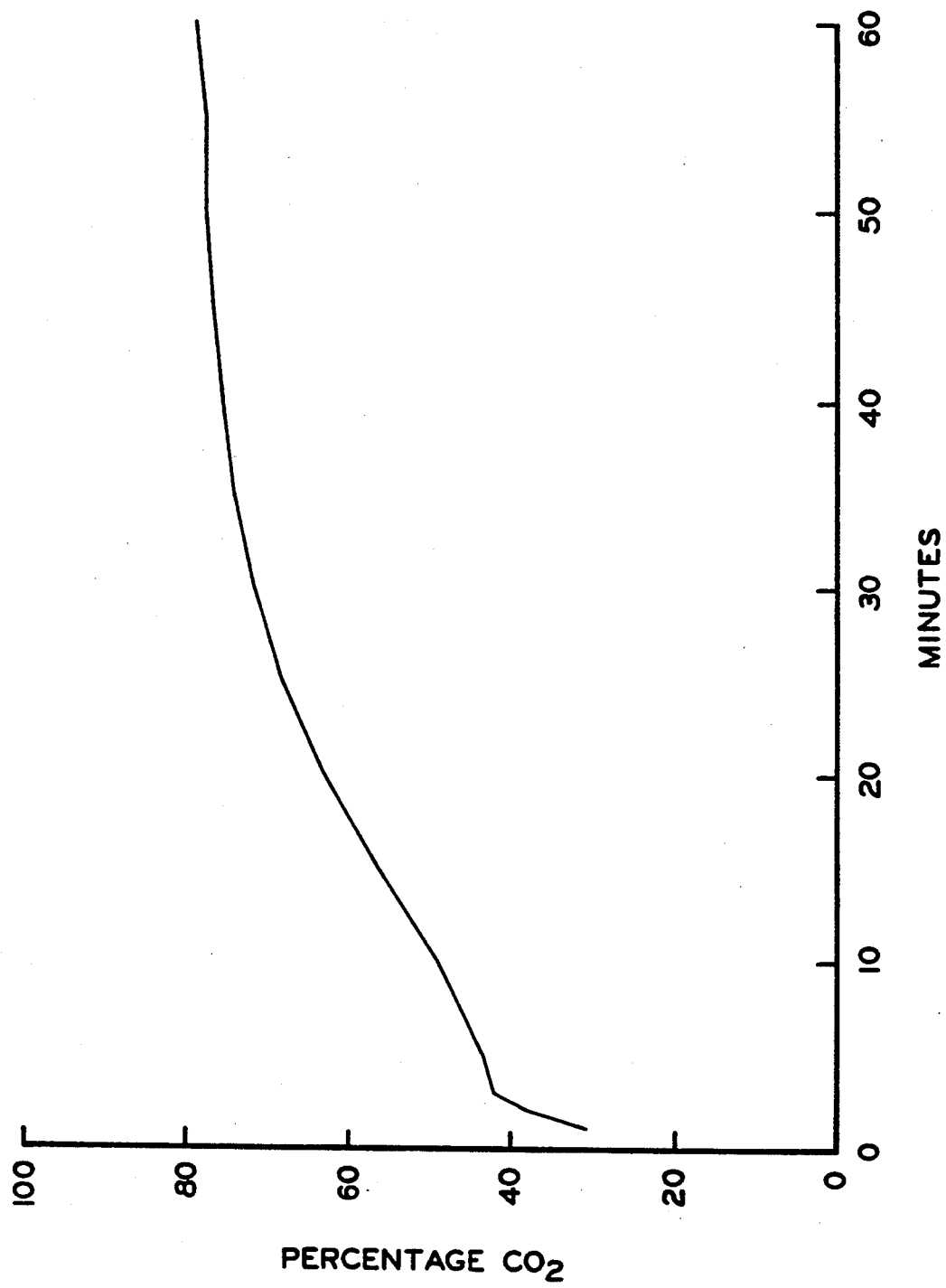
FIG. 9 shows the results of the DRR test employing the calcium acid pyrophosphate of the prior art which has been milled to a smaller particle size.
Figure 9A:
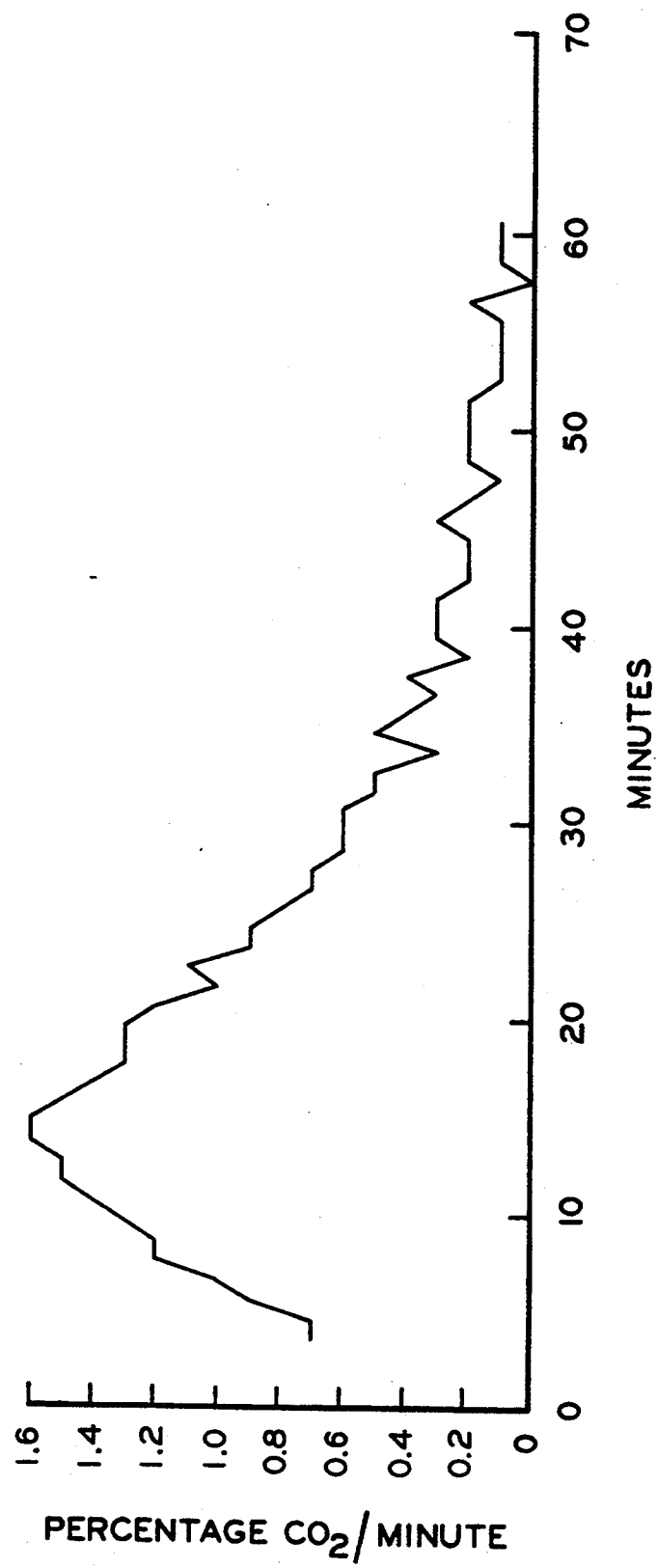

Another portion of material obtained from BKL employed in the DRR test to produce the data in Table 10 below was milled to a particle size having a mean diameter of 32 microns. The milled material was then employed as the acid factor in the leavening system used in the DRR test described above. The results of this test, conducted at 40° C. only, are shown in FIG. 9. The data obtained in the DRR test are presented in Table 10 below. In FIG. 9A there is shown the minute differential obtained from the data collected in the above-mentioned DRR test at 40° C. The treatment of the calcium pyrophosphate noted above did not significantly alter the rate of carbon dioxide release as measured in the DRR test for this type of material.

TABLE 10

| Time (Minutes) | 40° C. |
| --- | --- |
| 1 | 30.91 |
| 2 | 38.09 |
| 3 | 42.17 |
| 4 | 42.87 |
| 5 | 43.57 |
| 10 | 49.15 |
| 15 | 56.73 |
| 20 | 63.51 |
| 25 | 68.59 |
| 30 | 71.98 |
| 35 | 74.38 |
| 40 | 75.97 |
| 45 | 77.17 |
| 50 | 78.17 |
| 55 | 78.16 |
| 60 | 79.36 |

Figure 10:
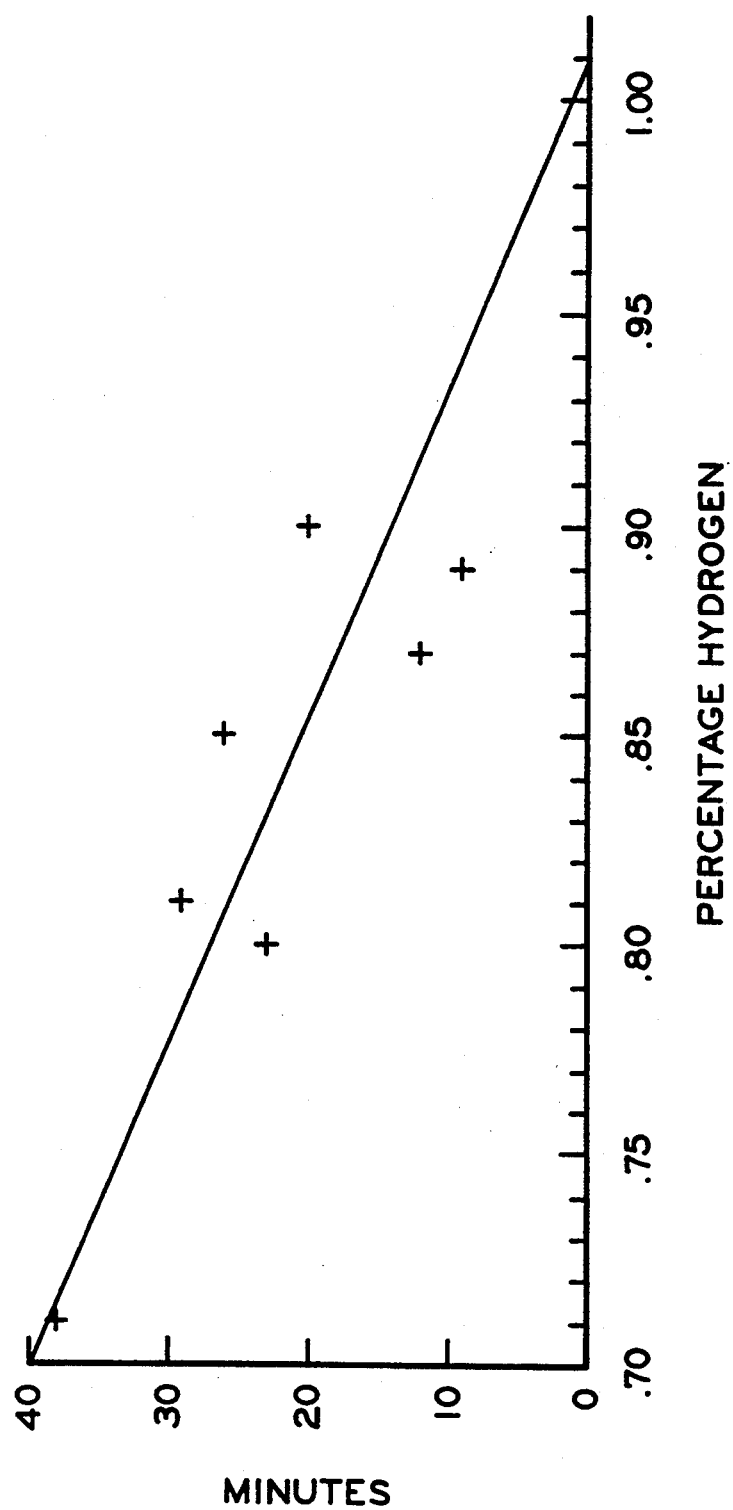
FIG. 10 shows the relationship between the amount of time delay before increase in carbon dioxide production after initial mixing in the DRR test and amount of hydrogen in the calcium acid pyrophosphate.

In FIG. 10 there is shown graphically the data in Table 1 indicating the amount of hydrogen found in the products of Examples 1, 1A, 1B and 2–5. This data is plotted against the t-$\frac{1}{2}$ data. The t-$\frac{1}{2}$ data is obtained in the DRR test at 40° C. and is the amount of time in minutes at the mid-point in the slope of the curve indicating the maximum rate of increase occurring subsequent to the termination of initial mixing characteristic of the calcium acid pyrophosphate of this invention. The above noted examples provide several variations in the preparation of the calcium acid pyrophosphate of this invention. For convenience, these variations are presented in Table 11 below in summary form together with the data plotted in FIG. 10. As is graphically shown by the data in FIG. 10, there appears to be a relationship between the amount of hydrogen in the calcium pyrophosphate of this invention and the number of minutes of delay after initial mixing. The number of minutes of delay (t-$\frac{1}{2}$) after initial mixing is extended inversely to the amount of hydrogen found in the calcium hydrogen pyrophosphate.

TABLE 11

| | example | | | | | | |
| --- | --- | --- | --- | --- | --- | --- | --- |
| | 1 | 1A | 1B | 2 | 3 | 4 | 5 |
| Variation | none | none | none | calcium carbonate | low temp | reduced calcium | increased calcium |
| % Hydrogen | 0.90 | 0.71 | 0.85 | 0.80 | 0.87 | 0.89 | 0.81 |
| t-$\frac{1}{2}$ (40° C.) (min) | 20 | 38 | 26 | 23 | 12 | 9 | 29 |

It is interesting to note that reduced temperature or reduced amount of calcium source during preparation of the calcium acid pyrophosphate of this invention reduces the t-$\frac{1}{2}$ of the resultant leavening action. Also, it is noted that the prior art calcium acid pyrophosphate (BKL) contains 1.00%, by weight, hydrogen and does not exhibit the delayed maximum production of carbon dioxide exhibited by the calcium acid pyrophosphate of this invention. The theoretical hydrogen content for a compound having the formula $CaH_2P_2O_7$ is 0.93% by weight. Such compound is not expected to exhibit the delayed maximum production of carbon dioxide exhibited by the calcium pyrophosphate of this invention.

While this invention has been described with reference to specific examples and materials, it is evident that numerous variations can be made in the practice of this invention, which variations may maintain the essential features of the present invention and are therefore within the scope of the invention.

What is claimed is:

1. A leavening composition comprising a carbonate factor and calcium acid pyrophosphate, said composition exhibiting, in a dough rate of reaction (DRR) test, a maximum rate of release of carbon dioxide occurring between about 17 to about 40 minutes after initial mixing, said maximum rate being at least twice the rate observed at the termination of mixing in said test, said pyrophosphate being produced by reacting a calcium ion source with a large molar excess of phosphoric acid at an elevated temperature whereby a crystalline product is formed.

2. The leavening composition of claim 1 wherein the carbonate factor is sodium bicarbonate.

3. The leavening composition of claim 1 wherein the carbonate factor is selected from the group consisting of potassium bicarbonate, ammonium bicarbonate and stabilized x-ray amorphous calcium carbonate.

4. A process for leavening a fresh, refrigerated or frozen dough product which comprises mixing with flour, water and shortening a leavening system comprising a carbonate factor and calcium acid pyrophosphate, said system exhibiting, in a dough rate of reaction (DRR) test, a maximum rate of release of carbon dioxide occurring between about 17 to about 40 minutes after initial reaction, said maximum rate being at least twice the rate observed at the termination of mixing of said test, said pyrophosphate being produced by reacting a calcium ion source with a large molar excess of phosphoric acid at an elevated temperature whereby a crystalline product is formed.

5. A process of claim 4 wherein the carbonate factor is selected from the group consisting of sodium bicarbonate, stabilized x-ray amorphous calcium carbonate, ammonium bicarbonate and potassium bicarbonate.

6. The process of claim 4 wherein the carbonate factor is sodium bicarbonate.

7. A fresh, refrigerated or frozen dough product comprising a mixture of flour, water, shortening, and leavening system comprising a carbonate factor and a calcium acid pyrophosphate produced by reacting monocalcium phosphate or a monohydrate thereof with a large molar excess of phosphoric acid at elevated temperatures whereby a crystalline product is formed.

8. A fresh, refrigerated or frozen dough product of claim 7 wherein the carbonate factor is sodium bicarbonate.

9. A fresh, refrigerated or frozen dough product of claim 8 wherein the carbonate factor is selected from the group consisting of potassium bicarbonate, ammonium bicarbonate and stabilized, x-ray amorphous calcium carbonate.

10. A refrigerated dough of claim 9 selected from the group consisting of cake dough, biscuit dough, and pizza dough.

11. A fresh, refrigerated or frozen batter product comprising a mixture of flour, a suitable liquid, shortening, and a leavening system comprising a carbonate factor and a calcium acid pyrophosphate produced by reacting monocalcium phosphate or monohydrate thereof with a large molar excess of phosphoric acid at an elevated temperature whereby a crystalline product is formed.

12. A batter product of claim 11 comprising a frozen batter selected from the group consisting of pancake, cake and biscuit batters.

13. A fresh, refrigerated dry mix product comprising a mixture of flour, shortening, and leavening system comprising a carbonate factor and a calcium acid pyrophosphate produced by reacting monocalcium phosphate or a monohydrate thereof with a large molar excess of phosphoric acid at an elevated temperature whereby a crystalline product is formed.

14. A leavened baked good which comprises a leavening system, wherein the carbonate factor and calcium acid pyrophosphate, provides in a dough rate of reaction (DRR) test, a maximum rate of release of carbon dioxide occurring between about 17 to about 40 minutes after initial reaction, said maximum rate being at least twice the rate observed at the termination of mixing of said test, said pyrophosphate being produced by a reaction of a calcium ion source with a large molar excess of phosphoric acid at elevated temperature whereby crystalline product is formed.

15. A leavened baked good of claim 14 selected from the group consisting of cakes, pancakes, hush puppies, cookies, waffles, pizza, muffins, crackers and biscuits.

* * * * *